(12) United States Patent
Itafuji et al.

(10) Patent No.: US 9,243,720 B2
(45) Date of Patent: Jan. 26, 2016

(54) COUPLING APPARATUS FOR CHEMICAL FLUID FLOW CHANNEL

(71) Applicant: CKD CORPORATION, Komaki-shi, Aichi (JP)

(72) Inventors: Hiroshi Itafuji, Komaki (JP); Masayuki Kouketsu, Komaki (JP)

(73) Assignee: CKD CORPORATION, Komaki-Shi, Aichi (JP)

( * ) Notice: Subject to any disclaimer, the term of this patent is extended or adjusted under 35 U.S.C. 154(b) by 220 days.

(21) Appl. No.: 14/024,458

(22) Filed: Sep. 11, 2013

(65) Prior Publication Data

US 2014/0007958 A1 Jan. 9, 2014

Related U.S. Application Data

(63) Continuation of application No. 13/108,909, filed on May 16, 2011, now Pat. No. 8,544,500.

(30) Foreign Application Priority Data

May 18, 2010 (JP) .................................. 2010-114814
May 18, 2010 (JP) .................................. 2010-114815
Apr. 22, 2011 (JP) .................................. 2011-095815

(51) Int. Cl.
*F16K 27/00* (2006.01)
*F16K 27/02* (2006.01)

(52) U.S. Cl.
CPC ........... *F16K 27/003* (2013.01); *F16K 27/0236* (2013.01); *Y10T 137/4259* (2015.04); *Y10T 137/8158* (2015.04); *Y10T 137/87249* (2015.04); *Y10T 137/87925* (2015.04)

(58) Field of Classification Search
CPC .............. F16K 27/003; F16K 27/0236; Y10T 137/87249; Y10T 137/4259; Y10T 137/87925
USPC ......................................... 137/240, 551, 597
See application file for complete search history.

(56) References Cited

U.S. PATENT DOCUMENTS

| 4,281,683 A | 8/1981 | Hetherington et al. |
| 4,989,630 A | 2/1991 | Yonezawa |
| 5,311,899 A | 5/1994 | Iasayama et al. |

(Continued)

FOREIGN PATENT DOCUMENTS

| EP | 0 190 863 | 8/1986 |
| JP | 61-184295 | 8/1986 |

(Continued)

*Primary Examiner* — Kevin Lee
(74) *Attorney, Agent, or Firm* — Beyer Law Group LLP

(57) ABSTRACT

A chemical liquid circuit apparatus includes a main circuit member, a sub-circuit member, and a frame member. The main circuit member has a chemical liquid channel for flowing a chemical fluid, and a main opening formed on an end of the chemical liquid channel. The sub-circuit member is mounted on and in contact with the main circuit member and applies a first load to the main circuit member. The sub-circuit member has a sealing surface for sealing the main opening from outside of the apparatus. The frame member has a storing portion for storing the main circuit member, and a connecting opening disposed in a position in communication with the main opening of the main circuit member stored in the storing portion. The shape of the frame member allows a reaction force of the first load to be transferred from the storing portion to the main circuit member.

10 Claims, 25 Drawing Sheets

(56) References Cited

U.S. PATENT DOCUMENTS

| | | | |
|---|---|---|---|
| 5,863,023 A * | 1/1999 | Evans et al. | 137/614.21 |
| 7,306,007 B2 | 12/2007 | Matsumoto | |
| 7,950,619 B2 | 5/2011 | Takeda et al. | |
| 8,033,579 B2 | 10/2011 | Takeda et al. | |
| 2008/0012290 A1 | 1/2008 | Hamada | |

FOREIGN PATENT DOCUMENTS

| | | |
|---|---|---|
| JP | 62-128202 U | 8/1987 |
| JP | 62-128203 U | 8/1987 |
| JP | 62-131102 U | 8/1987 |
| JP | 63-135606 U | 6/1988 |
| JP | 04-194402 | 7/1992 |
| JP | 04-272597 | 9/1992 |
| JP | 07-269732 | 10/1995 |
| JP | 11-132352 | 5/1999 |
| JP | 11-304030 | 11/1999 |
| JP | 2001-090855 | 4/2001 |
| JP | 2001-330161 | 11/2001 |
| JP | 2002-243090 | 8/2002 |
| JP | 2004-316667 | 11/2004 |
| JP | 2005-344796 | 12/2005 |
| JP | 2006-316806 | 11/2006 |
| JP | 2007-2902 | 1/2007 |
| JP | 2007-85504 | 4/2007 |
| JP | 2007-092959 | 4/2007 |
| JP | 2007-292217 | 11/2007 |
| JP | 2008-039156 | 2/2008 |
| JP | 2008-082358 | 4/2008 |
| JP | 2008-85504 | 4/2008 |
| JP | 2008-106811 | 5/2008 |
| JP | 2008-151260 | 7/2008 |
| JP | 2009-103303 | 5/2009 |
| JP | 2009-133488 | 6/2009 |
| JP | 2009-138837 | 6/2009 |
| JP | 2008-208904 | 9/2009 |
| JP | 2009-264587 | 11/2009 |

* cited by examiner

Chemical Fluid Supply Mode (Filling Mode)

Purge Mode

COUPLING APPARATUS FOR CHEMICAL FLUID FLOW CHANNEL

CROSS-REFERENCE TO RELATED APPLICATIONS

This application is a Continuation of patent application Ser. No. 13/108,909 filed May 16, 2011 now U.S. Pat. No. 8,544,500 which claims priority of Japanese Patent Application No. 2010-114814 filed on May 18, 2010, Japanese Patent Application No. 2010-114815 filed on May 18, 2010, and Japanese Patent Application No. 2011-95815 filed on Apr. 22, 2011, all of which are hereby incorporated by reference.

BACKGROUND OF THE INVENTION

1. Field of the Invention

The present invention relates to a flow channel structure, and more particularly to a coupling structure of flow channels that convey chemical liquid utilized in a semiconductor fabrication process and other production processes.

2. Description of the Related Art

Semiconductor fabrication devices use various chemical liquid, for example, HMDS liquid. The HMDS liquid is fed by a pump to a vaporizer via a chemical liquid flow channel such as a pipe or a manifold. The chemical liquid flow channel is sometimes required to be decoupled, for example, to perform the maintenance of the semiconductor fabrication device. The related art techniques used for such decoupling are described in Japanese Patent Application Publications No. 2007-292217 and No. 2008-85504.

However, the problem is that chemical liquid leaks (including vaporization) to the outside from the disconnected portion when the chemical liquid flow channel is decoupled.

SUMMARY OF THE INVENTION

Accordingly, an object of the present invention is to solve at least a part of the aforementioned problems described above with a technique for reducing the leak of chemical liquid in decoupling of chemical liquid flow channels.

The above and other object of the present invention are attained at least partly by a chemical liquid circuit apparatus including a main circuit member, a sub-circuit member, and a frame member. A main circuit member has a chemical liquid channel for flowing a chemical fluid, and a main opening formed on an end of the chemical liquid channel. The sub-circuit member is mounted on and in contact with the main circuit member such that a first load is applied to the main circuit member. The sub-circuit member has a sealing surface for sealing the main opening from outside of the chemical liquid circuit apparatus. The frame member has a storing portion for storing the main circuit member, and a connecting opening disposed in a position connecting to the main opening of the main circuit member stored in the storing portion. The frame member has such a shape that a reaction force of the first load is transferred from the storing portion to the main circuit member.

The storing portion may includes a mounting portion mounted on the sub-circuit member, and a support member having a contact surface facing the mounting portion, the contact surface transferring the load to the main circuit member, and may further include an insert opening for inserting the main circuit member along the contact surface so as to install the main circuit member in the storing portion.

The main circuit member may include a valve body having a plurality of chemical liquid channels, and the sub-circuit member may include a valve member actuator having a valve member configured to switch channels by opening and blocking mutual communications between the plurality of chemical liquid channels.

The plurality of chemical liquid channels may include a first flow channel, a second flow channel, and a first valve member chamber provided in a position for connecting the first flow channel and the second flow channel.

The valve member actuator may include a first valve member and a second valve member. The first valve member is provided inside the first valve member chamber and configured to block the communications between the first flow channel and the first valve member chamber by closing a first opening connected to the first flow channel, the first opening being formed on an inner wall surface of the first valve member chamber. The second valve member is configured to block the communications between the second flow channel and the first valve member chamber by closing a second opening connected to the second flow channel, the second opening being formed in the inner wall surface of the first valve member chamber.

The second flow channel may include a second valve member chamber, and a coupling flow channel for connecting the second valve member chamber and the second opening. The first valve member may be configured to perform opening/closing operations within the first valve member chamber. The second valve member may be configured to perform opening/closing operations within the second valve member chamber, the second valve member having such a shape that the second opening is closed when the second valve member is inserted into the coupling flow channel.

The chemical liquid circuit may include a plurality of second flow channels and a corresponding plurality of second valve members. The first valve member may be a diaphragm valve member including a diaphragm membrane portion having a circumferential edge portion fixed to the valve body, and a protruding portion provided in a center of the diaphragm membrane portion and configured to open and close the first opening. The plurality of second flow channels may be formed and disposed so as to have respective openings in an annular portion formed by partitioning by the diagraph membrane portion in the first valve member chamber.

In addition, the sub-circuit member may include a state quantity sensor configured to sense a state quantity of the chemical fluid flowing in the main opening. The sub-circuit member may include a state controller configured to control a state quantity of the chemical fluid flowing in the main opening.

The frame member may include a plurality of storing portions, where each of the plurality of storing portions stores corresponding one of main circuit members. The sub-circuit member may include a joint channel connecting the main openings of the main circuit members stored in the storing portions.

The present invention can realized not only in the form of the chemical liquid flow channel coupling device, but also, for example, in the form of a control method for coupling and decoupling chemical liquid flow channels, a computer program that realizes this method, and a program medium.

These and other object, features, aspects and advantages of the present invention will become more apparent from the following detailed description of the preferred embodiments with the accompanying drawings.

BRIEF DESCRIPTION OF THE DRAWINGS

FIG. 4 is a cross-sectional view illustrating a chemical liquid circulation state of the chemical liquid flow channel coupling units 10, 10a;

FIG. 5 is a cross-sectional view illustrating a chemical liquid purging state of the chemical liquid flow channel coupling units 10, 10a;

FIG. 6 is a cross-sectional view illustrating a state after the chemical liquid purging of the chemical liquid flow channel coupling units 10, 10a;

FIG. 7 is a cross-sectional view illustrating the disconnection state of the coupling units 10, 10a;

DESCRIPTION OF THE EMBODIMENTS

The embodiments of the present invention will be described below with reference to the appended drawings.

(A. Constitution and Operation of Chemical Liquid Flow Channel Coupling Apparatus of the First Embodiment)

Figure 1:
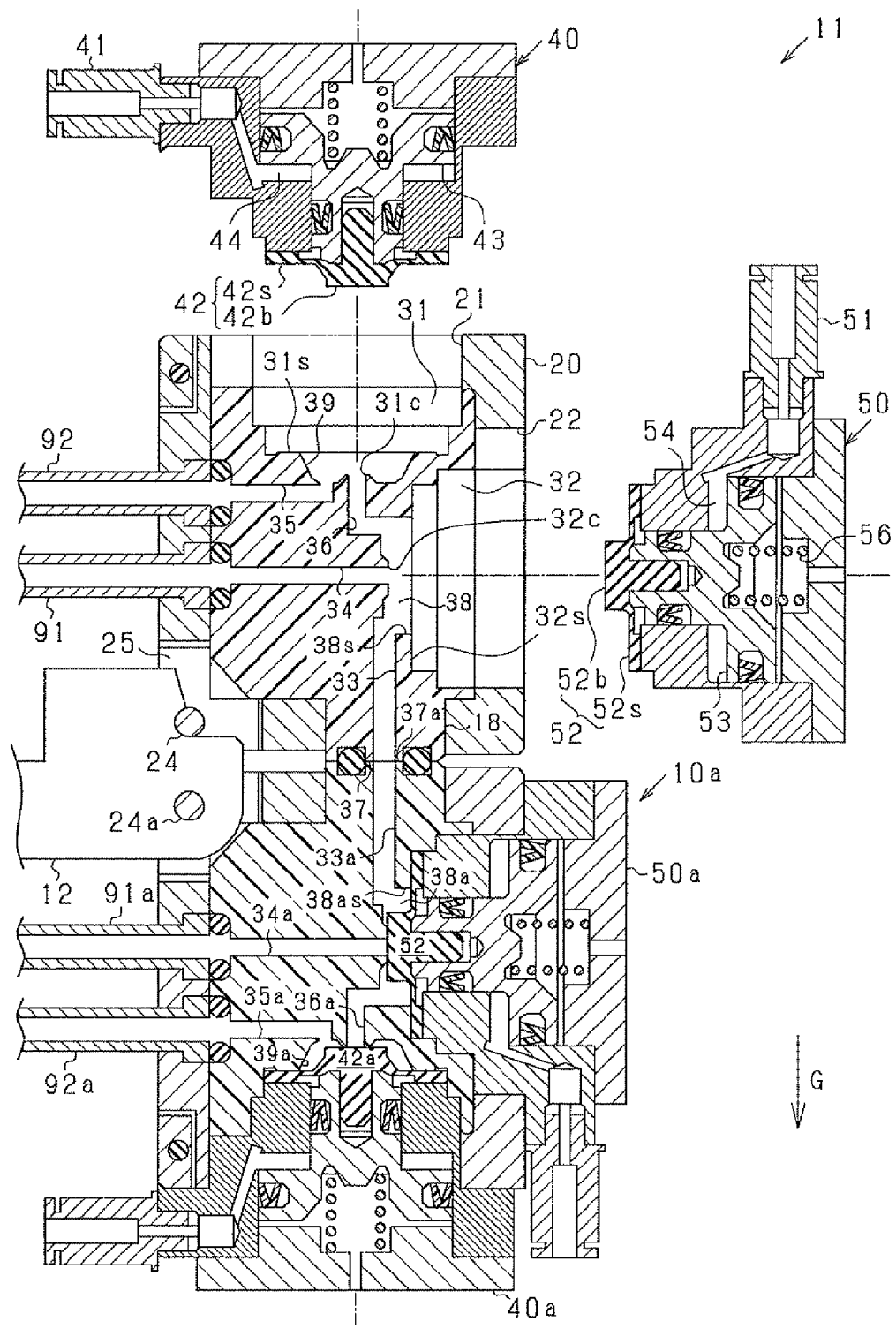
FIG. 1 is a cross-sectional view illustrating the internal flow channels of a chemical liquid flow channel coupling apparatus 11 according to the first embodiment.
Figure 2:
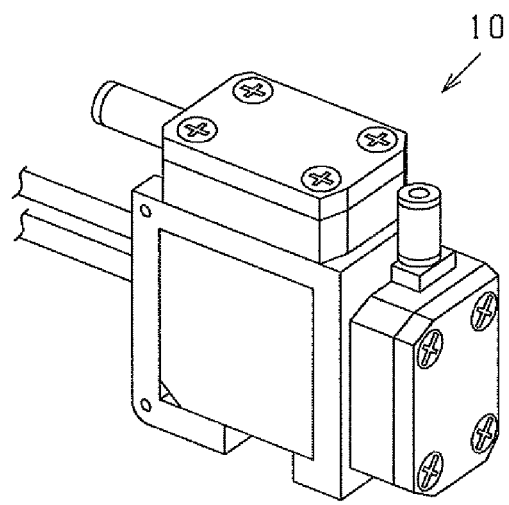
FIG. 2 is a perspective view illustrating a chemical liquid flow channel coupling unit 10 constituting the chemical liquid flow channel coupling apparatus 11.
Figure 3:
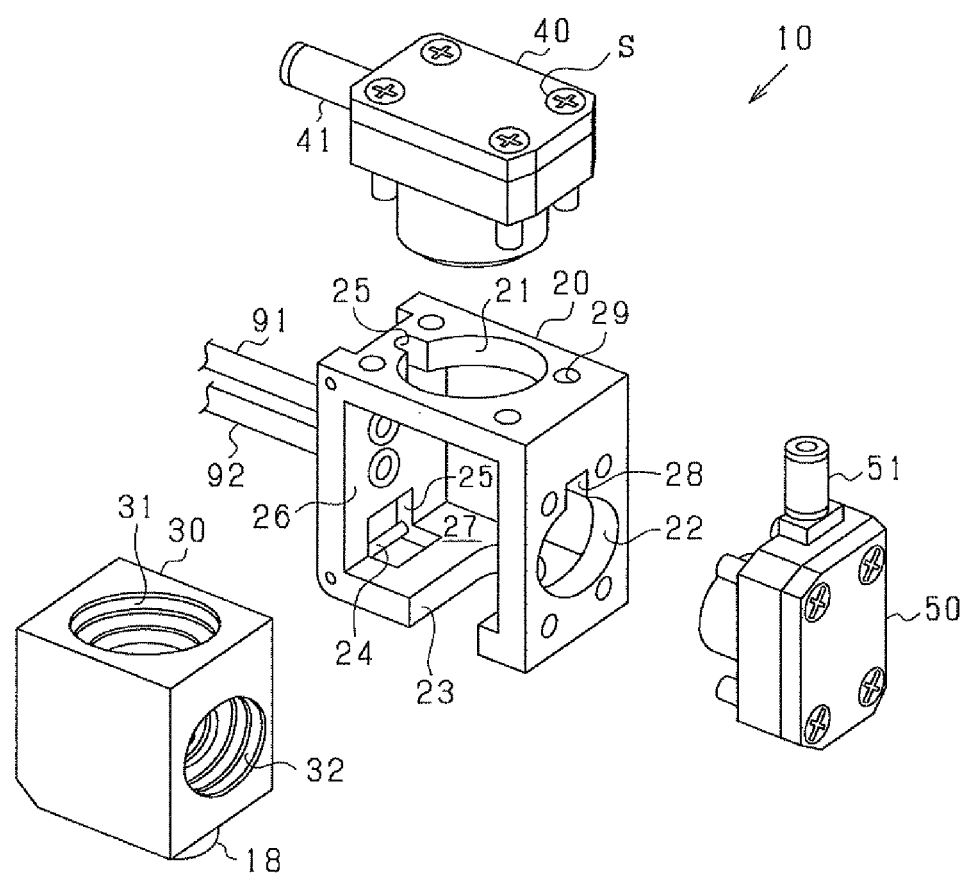
FIG. 3 is an exploded perspective view illustrating constituent parts of the chemical liquid flow channel coupling unit 10.

FIG. 1 is a cross-sectional view illustrating the internal flow channels of the chemical liquid flow channel coupling apparatus 11 according to the first embodiment. FIG. 2 is a perspective view illustrating the chemical liquid flow channel coupling unit 10 constituting the chemical liquid flow channel coupling apparatus 11. FIG. 3 is an exploded perspective view illustrating constituent parts of the chemical liquid flow channel coupling unit 10. The chemical liquid flow channel coupling apparatus 11 is provided with two chemical liquid flow channel coupling units 10, 10a and a joining member 12 mechanically coupling the two chemical liquid flow channel coupling units. The chemical liquid flow channel coupling units 10, 10a, individually function as flow channel switching valve members and are also referred to as coupling units. The coupling unit 10a and the coupling unit 10 are also referred to as the first coupling unit and the second coupling unit.

The chemical liquid flow channel coupling apparatus 11 makes it possible to couple and decouple chemical liquid flow channels by performing coupling and decoupling between the upstream chemical liquid flow channel coupling units 10 that supplies chemical liquid from chemical liquid supply pipe 91a and the downstream chemical liquid flow channel coupling units 10a that supplies the chemical liquid to a purge gas supply pipe 92a. The chemical liquid flow channel coupling apparatus 11 is further provided with the below-described flow channel for circulating a purge gas that serves to discharge the chemical liquid from the internal flow channels of the chemical liquid flow channel coupling apparatus 11 and leak the chemical liquid when the flow channels are decoupled.

The joining member 12 is rotatably mounted on a hinge 24 of the coupling unit 10 and engaged with a hinge 24a of the coupling unit 10a, thereby coupling the two coupling units 10, 10a with each other. The joining member 12 is shown in the figure to illustrate schematically the principle of bringing a pair of coupling surfaces 37, 37a into contact and joining, while applying a load thereto, and this joining member does not represent the actual coupling mechanism. The coupling surface 37 and the coupling surface 37a will be also referred to as a first coupling surface and a second coupling surface, respectively.

As shown in FIG. 2 and FIG. 3, the coupling unit 10 has a valve body 30 made from a fluororesin and having an inner flow channel formed therein, two valve member actuators 40, 50 that enable or disable the communication via the inner flow channel, and a frame member 20 for assembling the two valve member actuators 40, 50 with the valve body 30. In the present embodiment, the coupling unit 10a has a constitution identical to that of the coupling unit 10. The valve body 30 is also referred to as main circuit member. The valve member actuators 40, 50 are also referred to as sub-circuit member.

The valve member actuator 50 is a functional component that is made mainly of vinyl chloride and enables or disables the communication via the inner flow channel by actuating the valve member with operation air. The valve member actuator 50 is provided with a diaphragm valve member 52 that enables or disables the communication via the flow channel, a piston 53 that drives the diaphragm valve member 52, a pressure chamber 54 that applies a drive force to the piston 53 in the direction of enabling the communication via the flow channel, a spring 56 that applies to the piston 53 an impelling force in the opposite direction, and an adaptor 51 that supplies the operation air to the pressure chamber 54. The diaphragm valve member 52 has a protruding portion 52b having a round columnar shape and enabling or disabling the communication via the flow channel and an annular sealing portion 52s formed around the protruding portion 52b. The diaphragm valve member 52 corresponds to the diaphragm membrane. The diaphragm valve member 52 may be made from a fluororesin of the same type as that of the valve body 30.

The valve body 30 has formed therein a chemical liquid flow channel 34 connected to a chemical liquid receiving pipe 91 that receives the chemical liquid, a chemical liquid valve member chamber 38 communicating with the chemical liquid flow channel 34 via an opening 32c, and a coupling flow channel 33 communicating with the chemical liquid valve member chamber 38. The chemical liquid circulation path includes the coupling flow channel 33, the chemical liquid valve member chamber 38, and the chemical liquid flow channel 34 in the order of description. The chemical liquid valve member chamber 38 has an inner wall surface 38s formed in the valve body 30 and a sealing surface 32s and is tightly closed by intimate contact of the sealing surface 32s and a sealing portion 52s of the diaphragm valve member 52. The chemical liquid valve member chamber 38 is configured such that the communication between the chemical liquid valve member chamber 38 and the chemical liquid flow channel 34 is enabled or disabled when the opening 32c is opened or closed by the protruding portion 52b by the operation of the diaphragm valve member 52. The chemical liquid valve member chamber 38 is also referred to as main opening.

The valve body 30a has formed therein a chemical liquid flow channel 34a connected to a chemical liquid receiving pipe 91a that receives the chemical liquid, a chemical liquid valve member chamber 38a communicating with the chemical liquid flow channel 34a, and a coupling flow channel 33a communicating with the chemical liquid valve member chamber 38a. The chemical liquid circulation path includes the chemical liquid flow channel 34a, the chemical liquid valve member chamber 38a, and the coupling flow channel 33a in the order of description. In the chemical liquid valve member chamber 38a, the communication between the chemical liquid valve member chamber 38a and the chemical liquid flow channel 34a is enabled or disabled by the inner wall surface 38 as formed in the valve body 30 and the diaphragm valve member 52a.

The chemical liquid valve member chamber 38a and the chemical liquid valve member chamber 38 are also referred to as the first chemical liquid valve member chamber and the second chemical liquid valve member chamber, respectively. Further, the valve body 30a and valve body 30 are also referred to as the first valve body and the second valve body, respectively. The inner wall surface 38 as and the inner wall surface 38s are also referred to as the first inner wall surface and the second inner wall surface, respectively. The opening of the chemical liquid flow channel 34a communicating with the chemical liquid valve member chamber 38a is also referred to as the first chemical liquid opening, and the opening of the chemical liquid flow path 34 communicating with the chemical liquid valve member chamber 38 is also referred to as the second chemical liquid opening. The coupling flow channel 33a and the coupling flow channel 33 are also referred to as the first coupling flow channel and the second coupling flow channel, respectively.

The chemical liquid circulation flow channel of the chemical liquid flow channel coupling apparatus 11 is described below. The chemical liquid is supplied from the chemical liquid supply pipe 91a and can be supplied to the chemical liquid receiving pipe 91 via the chemical liquid flow channel 34a, the chemical liquid valve chamber 38a, and the coupling flow channel 33a of the coupling unit 10a and the coupling flow channel 33, chemical liquid valve chamber 38, and chemical liquid flow channel 34 of the coupling unit 10 in the order of description. The present flow channel is configured such that the chemical liquid flows from bottom to top, the gravity force direction G being the reference direction, and includes no portions in which the chemical liquid flows from top to bottom.

The switching constitution that enables and disables the communication in the chemical liquid flow channel coupling apparatus 11 will be described below. The coupling unit 10a can block the flow channel from the chemical liquid supply pipe 91a in the chemical liquid valve chamber 38a. The coupling unit 10 can block the flow channel to the chemical liquid receiving pipe 91 in the chemical liquid valve chamber 38. As a result, the chemical liquid flow channel coupling apparatus 11 can block the flow channel in the chemical liquid valve chamber 38 and the chemical liquid valve chamber 38a. Therefore, even if the flow channel between the coupling flow channel 33a and the coupling flow channel 33 is disconnected, the chemical liquid is prevented from leaking from the chemical liquid supply pipe 91a and the chemical liquid receiving pipe 91. The chemical liquid valve chamber 38 is also referred to as main opening.

Further, the chemical liquid flow channel coupling apparatus 11 has a function of purging the chemical liquid from the chemical liquid flow channel having the above-described constitution. The purging function is realized by the internal flow channels for purging of two valve bodies 30, 30a and two valve member actuators 40, 40a.

The valve member actuator 40 is a functional component that actuates the valve member by operation air to enable and disable the communication of the purge gas flow channel. In the present embodiment, this valve member actuator is configured in the same manner as the valve member actuator 50. The valve member actuator 40 is provided with the diaphragm valve member 42, piston 43, pressure chamber 44, and adaptor 41. The diaphragm valve member 42 is made from a fluororesin and has the protruding portion 42b and the sealing portion 42s.

A purge gas flow channel 35 connected to the purge gas discharge pipe 92 for discharging the purge gas, a purge gas valve chamber 39 communicating with the purge gas flow channel 35, and a connection flow channel 36a communicating with the purge gas valve chamber 39 and the chemical liquid valve chamber 38 are formed as a purge gas flow channel in the valve body 30. The purge gas valve chamber 39 is tightly closed when the sealing surface 31s and the sealing portion 42s of the diaphragm valve member 42 are abutted against each other. In the purge gas valve chamber 39, the communication between the purge gas flow channel 35 and the connection flow channel 36 communicating with the chemical liquid valve chamber 38 is enabled and disabled by the diaphragm valve member 42. Recesses 31, 32 of shapes such that the valve member actuators 40, 50 can be respectively fitted therein are formed in the valve body 30. The chemical liquid valve chamber 38 and the purge gas valve chamber 39 are disposed in the deepest portions of the recesses 31, 32, respectively. The chemical liquid valve chamber 38 and the purge gas valve chamber 39 are formed by mounting the valve member actuators 40, 50 on the recesses 31, 32, respectively.

A purge gas flow channel 35a connected to the purge gas supply pipe 92a for supplying the purge gas, a purge gas valve chamber 39a communicating with the purge gas flow channel 35a, and a connection flow channel 36 communicating with the purge gas valve chamber 39a and the chemical liquid valve chamber 38a are formed as a purge gas flow channel in the valve body 30a. In the purge gas valve chamber 39a, the communication between the purge gas flow channel 35a and the connection flow channel 36a communicating with the chemical liquid valve chamber 38a is enabled and disabled by the diaphragm valve member 42a.

The flow channel of the purge gas in the chemical liquid flow channel coupling apparatus 11 will be described below. The purge gas supplied from the purge gas supply pipe 92a can be successively supplied to the purge gas discharge pipe 92 via the purge gas flow channel 35a, connection flow channel 36a, chemical liquid valve chamber 38a, coupling flow channel 33a, coupling flow channel 33, chemical liquid valve chamber 38, connection flow channel 36a, and purge gas flow channel 35 in the order of description. As a result, the chemical liquid can be discharged from the connection flow channel 36a, chemical liquid valve chamber 38a, coupling flow channel 33a, coupling flow channel 33, chemical liquid valve chamber 38, and connection flow channel 36a by the purge gas in a state in which the flow channel from the chemical liquid supply pipe 91a is blocked in the chemical liquid valve chamber 38a and the flow channel to the chemical liquid receiving pipe 91 is blocked in the chemical liquid valve chamber 38.

The connection states of each flow channel to the chemical liquid valve chambers 38, 38a will be described below. The chemical liquid valve chamber 38a is connected to the connection flow channel 36a at the lowest position and connected to the coupling flow channel 33a at the highest position, the gravity force direction G being the reference direction. The chemical liquid valve chamber 38 is connected to the coupling flow channel 33 at the lowest position and connected to the connection flow channel 36 at the highest position, the gravity force direction G being the reference direction.

Further, in the chemical liquid flow channel coupling apparatus 11 of the first embodiment, each of the valve member actuators 40, 40a, 50, 50a is mounted on the valve bodies 30, 30a by contact, while applying a load (contact load) thereto. The valve member actuator 40 is passed through a fitting hole 21 of the frame member 20, and in this state four screws S are tightened in screw holes 29 of the frame member 20. As a result, the valve member actuator 40 is fitted in the recess 31 of the valve body 30 and mounted by bringing the sealing surface 32s and the sealing portion 42s of the diaphragm valve member 42 into contact with each other. The valve member actuator 50 is similarly passed through the fitting hole 22 of the frame member 20 and mounted by fitting into the recess 32 of the valve body 30. The number of screws S is preferably equal to or greater than four.

Key grooves 25, 28 are respectively formed in two fitting holes 21, 22 of the frame member 20. The key grooves 25, 28 serve to constrain the valve member actuators 40, 50 directionally and determine the orientation during assembling. Further, a notched portion 23 is formed as a notch rather than a through hole to enable the mounting of a coupling member 18 in which the coupling surface 37 of the valve body 30 has been formed. As a result, the frame member 20 can be disposed around the coupling member 18 and therefore the tightening load of the joining member 12 can smoothly flow to the valve body 30.

The valve member actuator 50a and the valve member actuator 50 are also referred to as a first chemical liquid control valve and a second chemical liquid control valve. The load applied by the valve member actuators 40a, 50a to the valve body 30a are also referred to as a first load. The load applied by the valve member actuators 40, 50 to the valve body 30 are also referred to as a second load.

According to the present mounting method, the reaction force of the contact load can be transmitted to the valve body 30 through the inner wall surface 26 and the inner wall surface 27 of the frame member 20 or example, when the valve member actuator 50 and the valve member actuator 40 of the coupling unit 10 are mounted. The valve member actuators 40, 40a, 50, 50a are joined to the valve bodies 30, 30a by tightening the four respective screws S in the screw holes 29. The aforementioned contact load can be adjusted by the tightening torque. The screw holes 29 correspond to mounting portions.

The inventors have also analyzed properties of a structural body composed of dissimilar materials that included the valve bodies 30, 30a constituted by an organic material such as a fluororesin, the valve member actuators 40, 40a, 50, 50a constituted by an organic material such as polyvinyl chloride, and the frame member 20 constituted by a material such as a metal of a PEEK (polyetheretherketone) resin. The analysis of properties was conducted from the standpoint of thermal stresses, plastic deformation, and modulus of longitudinal elasticity.

The thermal stressed analysis is described below. For example, where a metal material is used for the frame member 20, the frame member 20 has a linear thermal expansion coefficient lower than that obtained with the valve bodies 30, 30a and the valve member actuators 40, 40a, 50, 50a constituted by organic materials. Therefore, under a high-temperature environment, the surface pressure on the seal surface (for example, a constant surface of the sealing surface 32s and the sealing portion 42s) is increased by thermal expansion of the valve body 30 and the like and the valve member actuator 40 and the like. The resultant advantageous property is that sealing ability is not decreased by the increase in temperature.

Further, the organic material, such as a fluororesin, constituting the valve bodies 30, 30a and the valve member actuators 40, 40a, 50, 50a provides the degree of freedom in design by making it possible to adjust the linear thermal expansion coefficient by filling the organic material with glass fibers or mixing with a reinforcing material such as glass fibers.

The plastic deformation analysis is described below. The organic material, such as a fluororesin, constituting the valve bodies 30, 30a has high resistance to volume strains but can be easily plastically deformed (shape deformation). The analysis conducted by the inventors has predicted that, for example, in the conventional constitution (Japanese Patent Application Publication No. 2007-292217), thermal stresses induced in the nut insertion portion change the round hole shape of the insertion portion into elliptical, thereby creating gaps and play. For example, because of the gap and play, the fluid can leak or functional components can fall out.

In the present embodiment, the periphery of the valve bodies 30, 30a is constrained by surrounding the valve bodies 30, 30a with the frame body 20. Therefore, the degree of freedom of plastic deformation is restricted. Thus, it is clear that the structure in which the valve bodies 30, 30a are surrounded by the frame member 20 increases resistance to plastic deformation. As mentioned hereinabove, an organic material such as a fluororesin is resistant to volume strains. The inventors have confirmed that the aforementioned problems associated with gaps or play does not occur due to tightening between the frame member 20 and valve member actuators 40, 40a, 50, 50a and frame member 20 constituted by an organic material such as a polyvinyl chloride.

The analysis for modulus of longitudinal elasticity is described below. The valve member actuators 40, 40a, 50, 50a constituted by an organic material such as polyvinyl chloride has a high modulus of elasticity and a high mechanical strength and can be strongly tightened with the frame member 20. By contrast, when the valve member actuators

40, 40a, 50, 50a and valve bodies 30, 30a are tightened, elastic deformation is created at the contact surface of the sealing surface 32s of the valve body 30 made from a fluororesin and the sealing portion 42s of the diaphragm valve member 42.

By setting the appropriate correlation between the dimensions of the frame member 20 and the valve bodies 30, 30a, it is possible to realize stable setting of the amount of this elastic deformation that does not depend too much on the tightening force. More specifically, by setting the valve bodies 30, 30a to a somewhat larger size, it is possible to adjust (set) the amount of elastic deformation so as to induce the preset elastic deformation. As a result, it is possible to adjust the surface pressure between the sealing surface 32s and the sealing portion 42s that is determined by the elastic deformation and demonstrate good sealing performance.

Thus, the constituent components can be reliably tightened and the fluid can be prevented from leaking by effectively using the properties of materials and the structural aspect of the valve bodies 30, 30a being surrounded by the frame member 20.

Further, when the valve member actuator 40 is fitted in the recess 31, a fitting tolerance can be used such that takes the elastic deformation of the fluororesin recess 31 into account. Therefore, a simple structure can be realized, for example, by relaxing the tolerance of positional relationship of the two recesses 31, 32. Furthermore, a structure such that acts as a buffer layer may be obtained, for example, by using for the sealing portion 42s of the diaphragm valve member 42 a material with a modulus of longitudinal elasticity lower than that of the material of the valve body 30. The present structure realizes a structural body in which only a compressive load is applied to the valve body 30 and therefore high endurance can be realized.

As a result, the valve member actuator can be mounted on the valve body, without using tightening members (for example, bolts and nuts) passing through the valve body. As a result, a substantially linear and short flow channel can be formed from the purge gas valve chamber 39a to the purge gas valve chamber 39 in the valve body 30. Furthermore, the purge flow channel is realized in the direction from bottom to top at all times, that is, includes no path in the opposite direction (downward direction). Therefore, the purging effect can be greatly increased.

The contents of disconnection operation of the chemical liquid flow channel coupling apparatus 11 will be described below with reference to FIG. 4 to FIG. 6.

Figure 4:
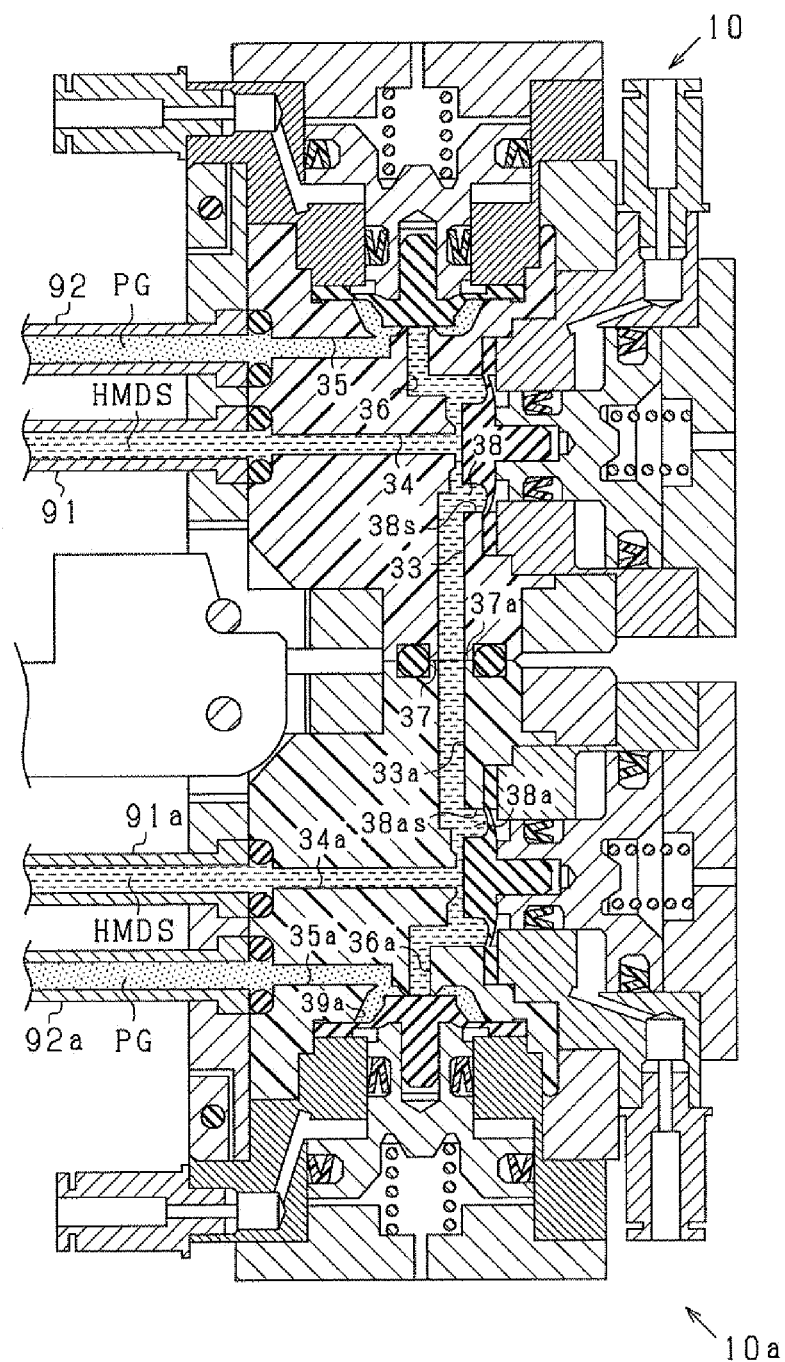

FIG. 4 is a cross-sectional view illustrating the chemical liquid circulation state of the chemical liquid flow channel coupling units 10, 10a. The chemical liquid circulation state is realized by communication between the chemical liquid flow channel 34a and the coupling flow channel 33a of the coupling unit 10 and communication between the coupling flow channel 33 and the chemical liquid flow channel 34 of the coupling unit 10a. The communication of the chemical liquid flow channel 34a and the coupling flow channel 33a is set by supplying the operation air from the adaptor 51a to the valve member actuator 50a. The communication between the chemical liquid flow channel 34 and the coupling flow channel 33 is set by supplying the operation air from the adaptor 51 to the valve member actuator 50.

The purge gas flow channel 35 of the coupling unit 10 is disconnected from the connection flow channel 36 communicating with the chemical liquid valve chamber 38. The purge gas flow channel 35a is disconnected from the connection flow channel 36a communicating with the chemical liquid valve chamber 38a. The communication of the purge gas flow channel 35 with the connection flow channel 36 is disabled by connecting the discharge path to the adaptor 41 of the valve member actuator 40. The communication of the purge gas flow channel 35a with the connection flow channel 36a is cut off by connecting the discharge path to the adaptor 41 of the valve member actuator 40a.

Thus, in the chemical liquid circulation state, the chemical liquid supplied from the chemical liquid supply pipe 91a is supplied to the chemical liquid receiving pipe 91 via the chemical liquid flow channel 34a, chemical liquid valve chamber 38a, coupling flow channel 33a, coupling flow channel 33, chemical liquid valve chamber 38, and chemical liquid flow channel 34 in the order of description. In this case, the purge gas flow channel 35 and the purge gas flow channel 35a are cut off by the valve member actuators 40, 40a from the flow channel in which the chemical liquid circulates.

Before the coupling units 10, 10a are disconnected, a chemical liquid pump (not shown in the figure) is stopped and then the supply of the operation air to all of the valve member actuators 40, 40a, 50, 50a is stopped. Then, a purge gas supply pump (not shown in the figure) is started. As a result, the coupling units 10, 10a are cut off from the chemical liquid receiving pipe 91, chemical liquid supply pipe 91a, purge gas discharge pipe 92, and purge gas supply pipe 92a.

Figure 5:
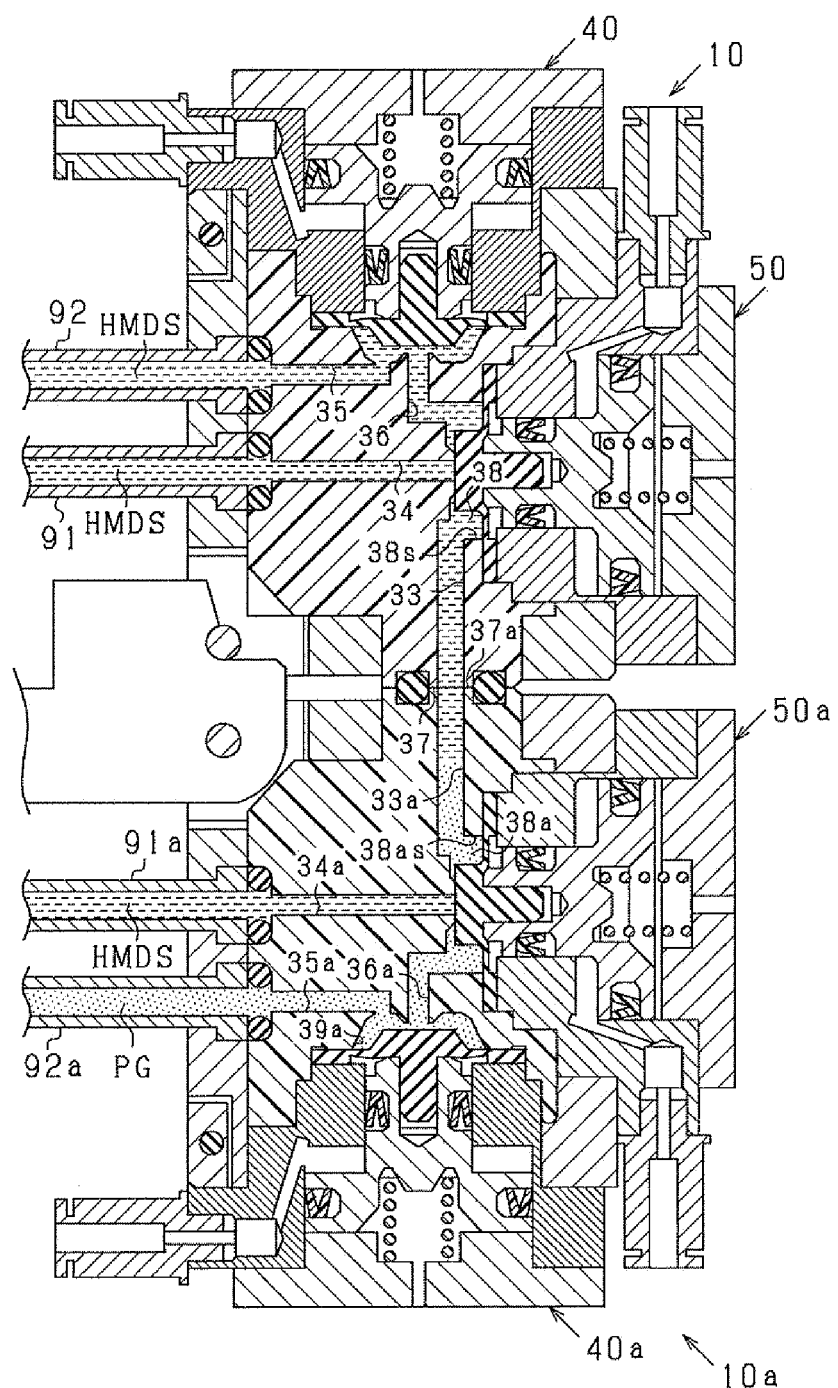

FIG. 5 is a cross-sectional view illustrating a chemical liquid purging state of the chemical liquid flow channel coupling units 10, 10a. The chemical liquid purging is a treatment in which the purge gas is introduced in the chemical liquid flow channel and the chemical liquid is discharged from the internal flow channels of the chemical liquid flow channel coupling units 10, 10a. In the chemical liquid purging state, the purge gas supplied from the purge gas supply pipe 92a is discharged together with the chemical liquid to the purge gas discharge pipe 92 via the purge gas flow channel 35a, connection flow channel 36a, chemical liquid flow channel 34a, chemical liquid valve chamber 38a, coupling flow channel 33a, coupling flow channel 33, chemical liquid valve chamber 38, chemical liquid flow channel 34, connection flow channel 36, and purge gas flow channel 35 in the order of description. In the state shown in the figure, the chemical liquid is discharged from the chemical liquid flow channel 34a, chemical liquid valve chamber 38a, and coupling flow channel 33a, and the chemical liquid is discharged from the coupling flow channel 33.

Figure 6:
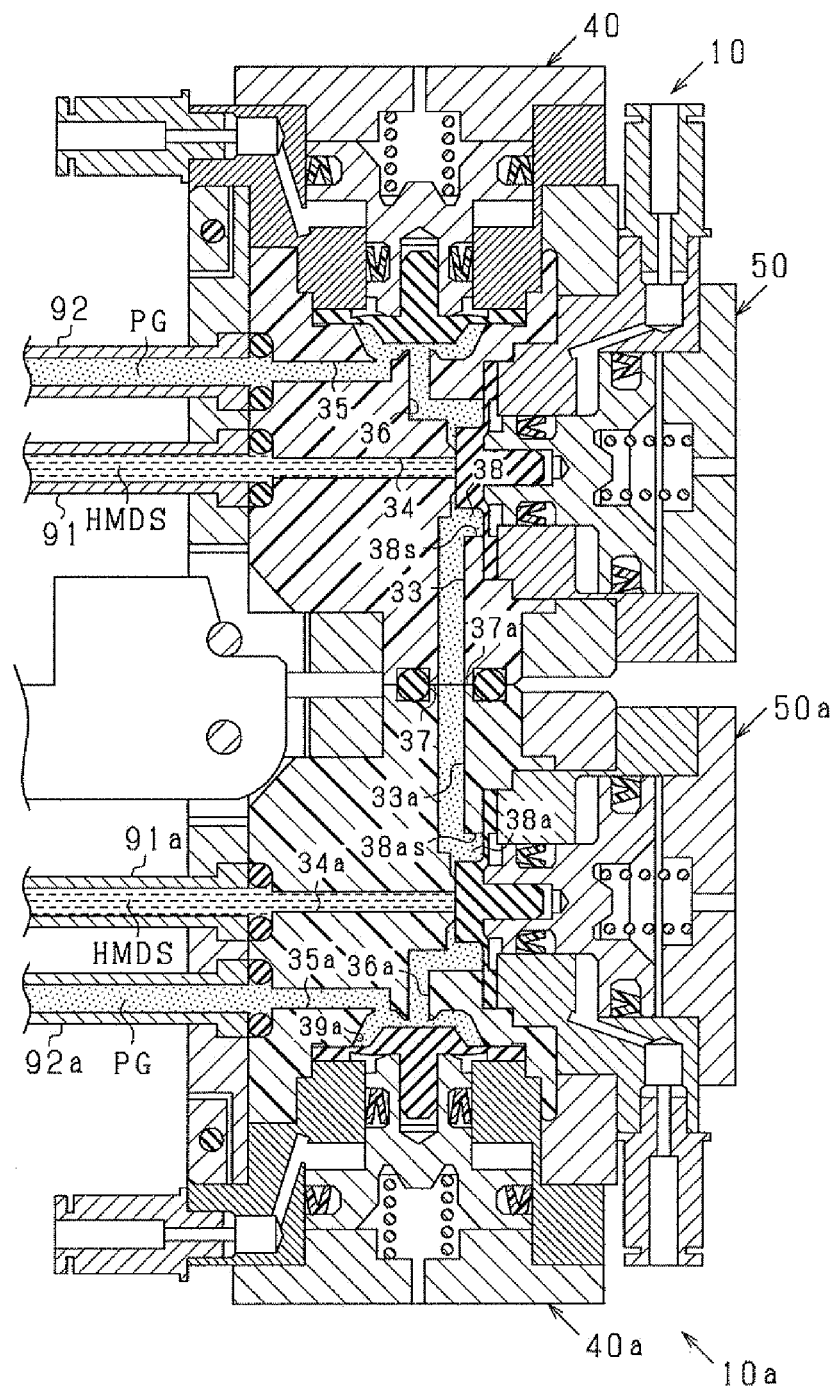

FIG. 6 is a cross-sectional view illustrating a state after the chemical liquid purging of the chemical liquid flow channel coupling units 10, 10a. Pressure reduction is performed, while the purge gas flows in the system, after the chemical liquid has been discharged from all of the flow channels including the purge gas flow channel 35a, connection flow channel 36a, chemical liquid flow channel 34a, chemical liquid valve chamber 38a, coupling flow channel 33a, coupling flow channel 33, chemical liquid valve chamber 38, chemical liquid flow channel 34, connection flow channel 36, and purge gas flow channel 35. As a result, the chemical liquid that has adhered to the flow channels is vaporized and the amount of remaining chemical liquid can be greatly reduced.

Figure 7:
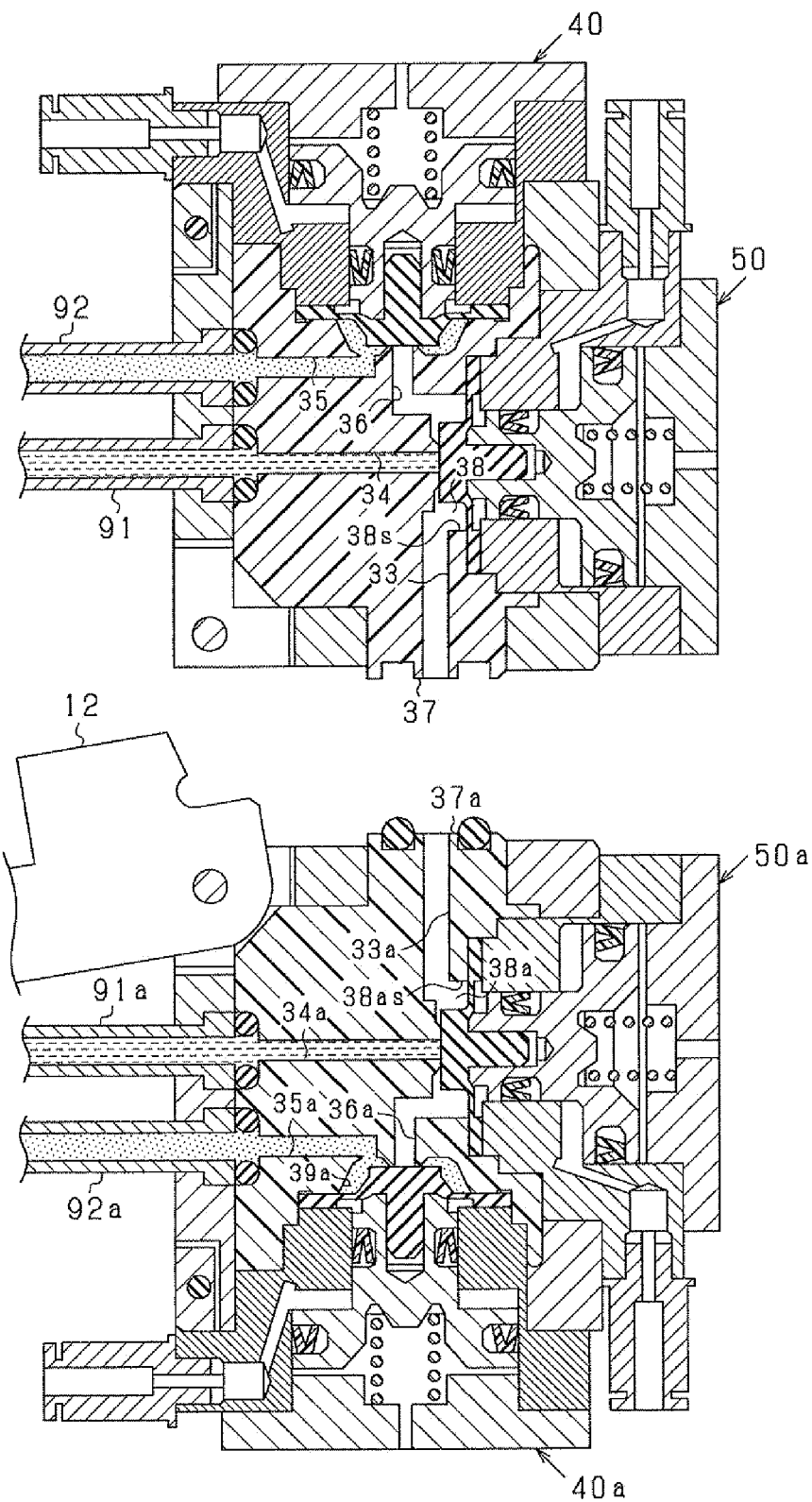

FIG. 7 is a cross-sectional view illustrating the decoupled state of the coupling units 10, 10a. The decoupling of the coupling units 10, 10a is performed by rotating the joining member 12 clockwise and releasing the engagement of the hinge 24a. As a result, the coupling between the pair of coupling surfaces 37, 37a is released, and the coupling flow channel 33 and the coupling flow channel 33a are opened to the atmosphere. Accordingly, all of the flow channels 38, 38a, 36, 36a communicating with the coupling flow channel 33 and the coupling flow channel 33a are opened to the atmosphere. In the present embodiment, since the chemical liquid has been removed in advance from all of the flow channels 33, 33a, 38, 38a, 36, 36a, the leak of the chemical liquid to the outside caused by the decoupling of the coupling units 10, 10a can be inhibited.

The coupling of the coupling units 10, 10a can be performed in the following steps.

(1) The operator performs mechanical coupling with the joining member 12.

(2) In a state in which the communication of the purge gas valve chamber 39a and the connection flow channel 36a is cut off, the operator causes the purge gas valve chamber 39 to communicate with the connection flow channel 36 and performs the evacuation of the purge gas discharge pipe 92. As a result, the pressure in the internal flow channel is reduced.

(3) The operator cuts off the communication between the purge gas valve chamber 39 and the connection flow channel 36.

(4) The operator sets the communication between the chemical liquid flow channel 34 and the chemical liquid valve chamber 38 and also sets the communication between the chemical liquid flow channel 34a and the chemical liquid valve chamber 38a. As a result, the chemical liquid is drawn into the flow channels.

(5) The operator can restart the circulation of the chemical liquid by actuating the chemical liquid pump (not shown in the figure).

Thus, in the chemical liquid flow channel coupling apparatus 11 of the first embodiment, the chemical liquid located in the short linear flow channel leading from bottom to top can be purged effectively. Therefore, the chemical liquid can be effectively prevented from leaking during decoupling. Further, since the valve bodies 30, 30a are reduced in size, the chemical liquid flow channel coupling apparatus 11 can be also reduced in size.

(B. Constitution and Operation of Chemical Liquid Flow Channel Coupling Device of Variation Example of the First Embodiment)

Figure 8:
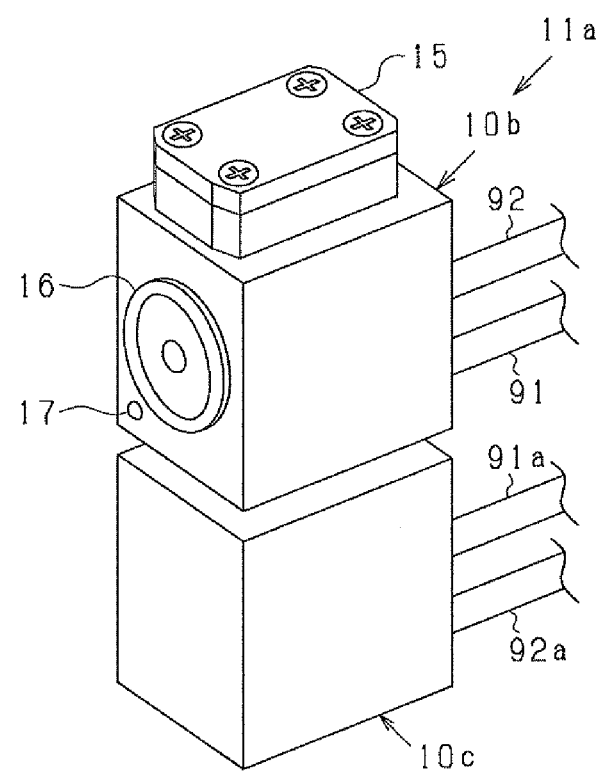
FIG. 8 is a perspective view illustrating a chemical liquid flow channel coupling apparatus 11a of the first variation example.

FIG. 8 is a perspective view illustrating a chemical liquid flow channel coupling apparatus 11a of the first variation example. The difference between the chemical liquid flow channel coupling apparatus 11a of the first variation example and the chemical liquid flow channel coupling apparatus 11 of the first embodiment is that the former is provided with a coupling unit 10b having a controller 15, and a coupling unit 10c that is constituted to be operable by the coupling unit 10b. The controller 15 can execute automatically the above-described processing sequence by operating four valve member actuators (not shown in the figure) incorporated in the coupling unit 10b and the coupling unit 10c.

The coupling unit 10b includes an operation button 16 and a LED indicator 17 in addition to the controller 15. When it is necessary to disconnect the coupling, for example for maintenance, the operator can start the above-described sequence by pushing the operation button 16. In the course of the processing sequence, the LED indicator 17 is red and as the processing is completed (preparation for disconnection is completed), the displayed light is changed to blue. The coupling unit 10b may also be configured to function so as to enable the release of coupling at the end of the processing sequence.

Figure 9:
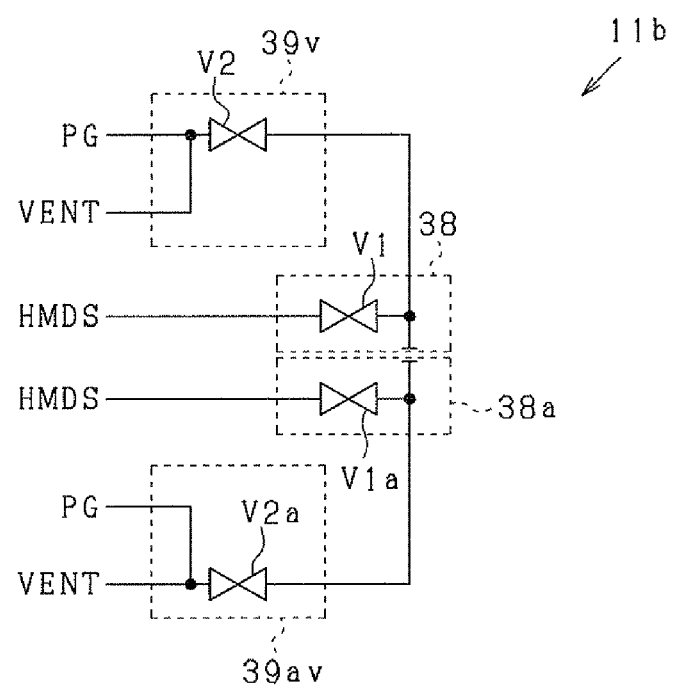
FIG. 9 is a flow channel circuit diagram of a chemical liquid flow channel coupling apparatus 11b of the second variation example.

FIG. 9 is a flow channel circuit diagram of a chemical liquid flow channel coupling apparatus 11b of the second variation example. A specific feature of the chemical liquid flow channel coupling apparatus 11b is that both the purge gas discharge pipe 92 and the purge gas supply pipe 92a are connected to either of purge gas valve chambers 39v, 39av.

With the present constitution, when the coupling units 10, 10a are coupled, the purge gas can be discharged from the purge gas valve chambers 39v, 39av, thereby effectively preventing the purge gas from mixing with the chemical liquid during coupling.

More specifically, where the purge gas valve chamber 39 is set to a communication cut-off state (valve V2 is closed) and the purge gas valve chamber 39 is set to a communication cut-off state (valve V2a is closed) in a coupling state (valves V1, V1a are open) in which the chemical liquid can be supplied to the chemical liquid valve chambers 38, 38a, the purge gas located inside the coupling flow channel 33 can be discharged via the purge gas valve chamber 39 by the supply of the chemical liquid. Where the valve V2 is opened and the valve V2a is closed in a state in which the valves V1, V2 are opened, the purge gas located inside the coupling flow channel 33a can be discharged via the purge gas valve chamber 39a by the supply of the chemical liquid.

(C. Constitution and Operation of Chemical Liquid Flow Channel Coupling Apparatus of the Second Embodiment)

Figure 10:
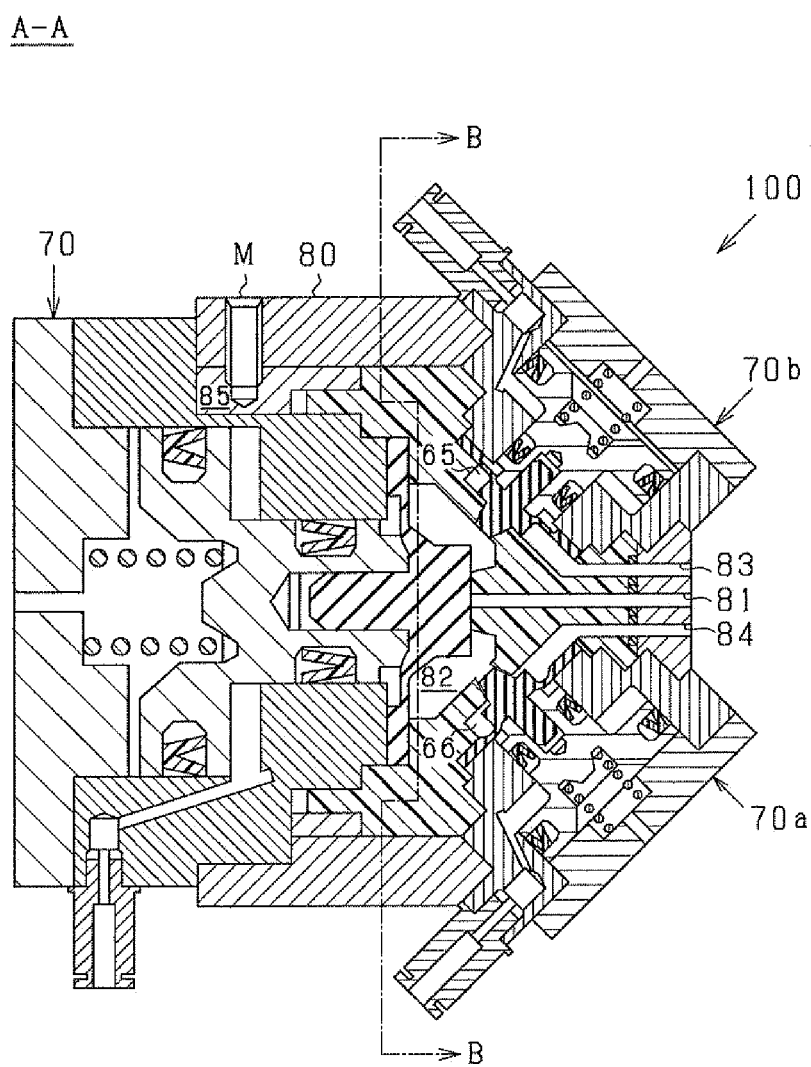
FIG. 10 is a cross-sectional view illustrating the internal flow channel of the chemical liquid flow channel switching apparatus 100 of the second embodiment.
Figure 11:
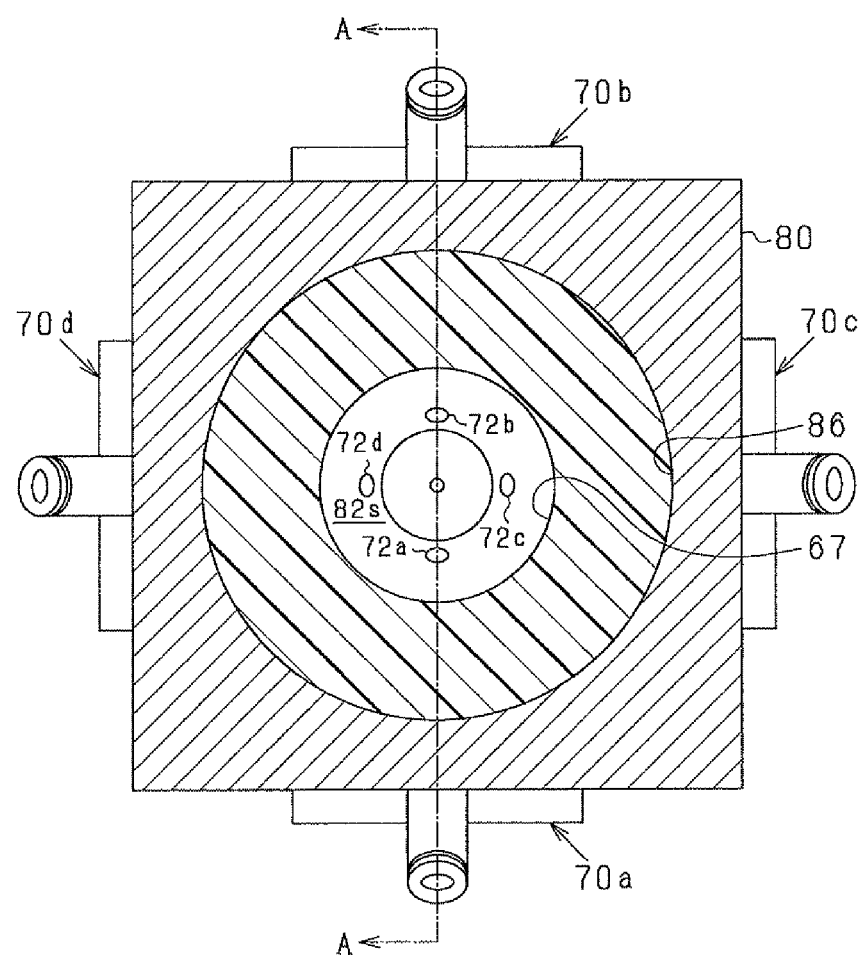
FIG. 11 is a cross-sectional view illustrating the internal flow channel of the chemical liquid flow channel switching apparatus 100.
Figure 12:
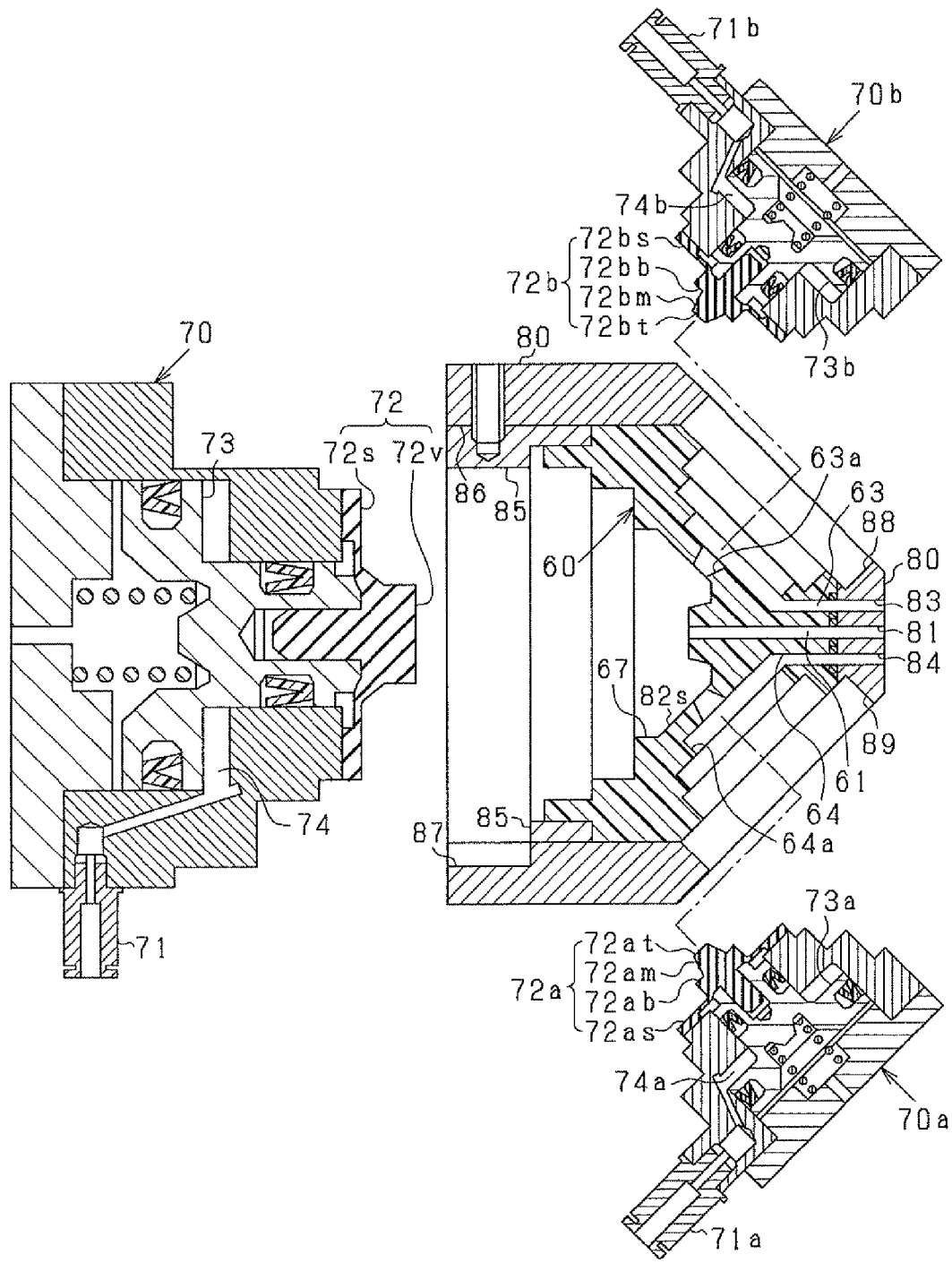
FIG. 12 is an exploded perspective view illustrating the constituent components of the chemical liquid flow channel switching apparatus 100.

FIG. 10 and FIG. 11 are cross-sectional views illustrating the internal flow channel of the chemical liquid flow channel switching apparatus 100 of the second embodiment. FIG. 12 is an exploded perspective view illustrating the constituent components of the chemical liquid flow channel switching apparatus 100. The chemical liquid flow channel switching apparatus 100 switches flow channels of chemical liquid of different types and includes five valve member actuators 70, 70a, 70b, 70c, 70d, a valve body 60, and a first frame member 80. In the present embodiment, the different types of chemical liquid are first chemical liquid and second chemical liquid.

The valve member actuator 70 is provided with a diaphragm valve member 72, a piston 73, a pressure chamber 74, and an adaptor 71. The diaphragm valve member 72 has a protruding portion 72v and a sealing portion 72s. The valve member actuator 70a is provided with a diaphragm valve member 72a, a piston 73a, a pressure chamber 74a, and an adaptor 71a. The diaphragm valve member 72a has a sealing portion 72as, a protruding tip 72ab, a tubular slanted surface 72am, and a protruding surface 72at. The roles of the tubular slanted surface 72am and the protruding surface 72at will be described below. The valve member actuators 70b, 70c, 70d are configured similarly to the valve member actuator 70a. The valve body 60 is also referred to as main circuit member. The valve member actuators 70b, 70c, and 70d are also referred to as sub-circuit member.

An inner wall surface 82s forming a flow channel switching chamber 82 together with the diaphragm valve member 72 of the valve member actuator 70 is formed in the valve body 60. A first chemical liquid flow channel 63 that is a flow channel for supplying the first chemical liquid to the flow channel switching chamber 82, a second chemical liquid flow channel 64 that is a flow channel for supplying the second chemical liquid to the flow channel switching chamber 82, and an outlet flow channel 61 that supplies either of the first chemical liquid and the second chemical liquid from the flow channel switching chamber 82 to the outside communicates with the inner wall surface 82s.

A first chemical liquid flow channel 83 that communicates with the first chemical liquid flow channel 63, a second chemical liquid flow channel 84 that communicates with the second chemical liquid flow channel 64, and an outlet flow channel 81 that comes into contact with the outlet flow channel 61 when the first frame member is brought into contact with the valve body 60 are formed in the first frame member. The first frame member 80 has a tightening portion (for example, a threaded hole) for mounting the five valve member actuators 70, 70a, 70b, 70c, and 70d.

The valve body 60 is assembled with the first frame member 80 in the following manner. First, the valve body 60 is mounted on an inner recess 86 of the first frame member 80. Then, a second frame member 85 is tightened with a screw M in the inner recess 86, while pressing the valve body 60, which can be elastically deformed easily, against the inner recess 86. As a result, it is possible to produce a structural body in which the first frame member 80, the second frame member 85, and the valve body 60 are brought into intimate contact with each other. Thus, the frame member may be configured to include a plurality of components. Where the frame member is configured to include a plurality of components, the valve body 60 can be easily inserted by the frame member. Therefore, the degree of freedom in designing the shape of the valve body 60 can be increased.

The five valve member actuators 70, 70a, 70b, 70c, 70d are mounted on the aforementioned structural body and gradually tightened, while maintaining the individual tightening forces, thereby completing the assembly of the chemical liquid flow channel switching apparatus 100. In the present embodiment, the mutual arrangement of the five valve member actuators 70, 70a, 70b, 70c, 70d and the valve body 60 is regulated by the first frame member 80. Therefore, the balance of tightening forces can be realized regardless of the assembling method.

A valve member chamber 65 (see FIG. 10) is formed in the first chemical liquid flow channel 63 and communicated with the flow channel switching chamber 82 by a communication slanted hole 63a which is a cylindrical slanted hole. A valve member chamber 66 (see FIG. 10) is formed in the second chemical liquid flow channel 64 and communicated with the flow channel switching chamber 82 by a communication slanted hole 64a which is a cylindrical slanted hole. The flow channel switching chamber 82 corresponds to the first valve member chamber. The outlet flow channels 61, 81 correspond to a first flow channel. The first chemical liquid flow channel 63, first chemical liquid flow channel 83, second chemical liquid flow channel 64, and second chemical liquid flow channel 84 correspond to a second flow channel.

The opening of the outlet flow channel 61 formed in the inner wall surface 82s corresponds to the first opening. The openings of the first chemical liquid flow channel 63 and the second chemical liquid flow channel 64 formed in the inner wall surface 82s both correspond to the second opening. The communication slanted hole 63a corresponds to a linking passage. The valve member chamber 65 and the valve member chamber 66 correspond to the second valve member chamber.

The valve member actuator 70a can switch the communication state and communication cut-off state of the flow channel switching chamber 82 and the second chemical liquid flow channel 64 by actuating the diaphragm valve member 72a. The valve member actuator 70b can switch the communication state and communication cut-off state of the flow channel switching chamber 82 and the second chemical liquid flow channel 64 by actuating the diaphragm valve member 72b.

The valve member actuator 70c can switch the communication state and communication cut-off state of the flow channel switching chamber 82 and a purge gas supply flow channel (not shown in the figure). The valve member actuator 70d can switch the communication state and communication cut-off state of the flow channel switching chamber 82 and a purge gas supply flow channel (not shown in the figure). The diaphragm valve member 72 corresponds to the first valve member. The diaphragm valve members 72a, 72b, 72c, 72d correspond to the second valve member.

The communication cut-off state may be realized, for example, by bringing the tubular slanted surface 72am into contact with the inner surface of the communication slanted hole 63a or by bringing the surface of the protruding tip 72ab into contact with the inner wall surface of the valve member chamber 66. In the constitution in which the communication is cut off by contact with the tubular slanted surface 72am, the protruding tip 72ab may be omitted. In the constitution in which the communication is cut off by contact of the protruding tip 72ab, the diameter of the protruding tip 72ab can be reduced so that gap is formed between the protruding tip and the communication slanted hole 63a. When the communication is cut off by contact of the protruding tip 72ab, for example, a projecting portion can be provided at the end surface of the protruding tip 72ab to increase the surface pressure and obtain a degree of freedom in creating a constitution with improved sealing ability.

The diaphragm valve member 72a of the present embodiment may be configured to be inserted into the communication slanted hole 63a to reduce the volume of the recess communicating with the flow channel switching chamber 82. In this case, unintended mixing of the chemical liquid caused by switching of flow channels can be inhibited.

The valve member actuator 70a actuates the diaphragm valve member 72a in the valve member chamber 65 and inserts the tubular slanted surface 72am and the protruding surface 72at into the communication slanted hole 64a. The protruding surface 72at is disposed at a position in the same plane with the inner wall surface 82s or a position in which the protruding surface projects from the inner wall surface 82s into the flow channel switching chamber 82. Thus, the communication of the flow channel switching chamber 82 with the first chemical liquid flow channel 63 can be cut off without forming a recess in the first chemical liquid flow channel 63. Similarly to the valve member actuator 70a, the valve member actuator 70b can cut off the communication of the flow channel switching chamber 82 with the second chemical liquid flow channel 64, and no recess is required to be formed in the second chemical liquid flow channel 64.

The communication slanted hole 63a or the tubular slanted surface 72am are not necessarily required to be slanted and may have any constitution, provided that part of the diaphragm valve member 72a can be inserted into the communication slanted hole 63a, thereby eliminating the volume of the recess communicating with the flow channel switching chamber 82. However, the advantage of obtaining a sealable constitution by making oblique both the communication slanted hole and the tubular slanted hole is that the unintended mixing of the chemical liquid can be effectively inhibited. The communication slanted hole 63a corresponds to a linking flow channel.

In the constitution according to the second embodiment, the contact loads between the five valve member actuators 70, 70a, 70b, 70c, 70d and the valve body 60 cancel each other. Thus, since the five valve member actuators 70, 70a, 70b, 70c, and 70d are disposed symmetrically at positions facing each other, the members corresponding to the inner wall surface 26 or inner wall surface 27 of the first embodiment are not necessarily required.

Figure 13:
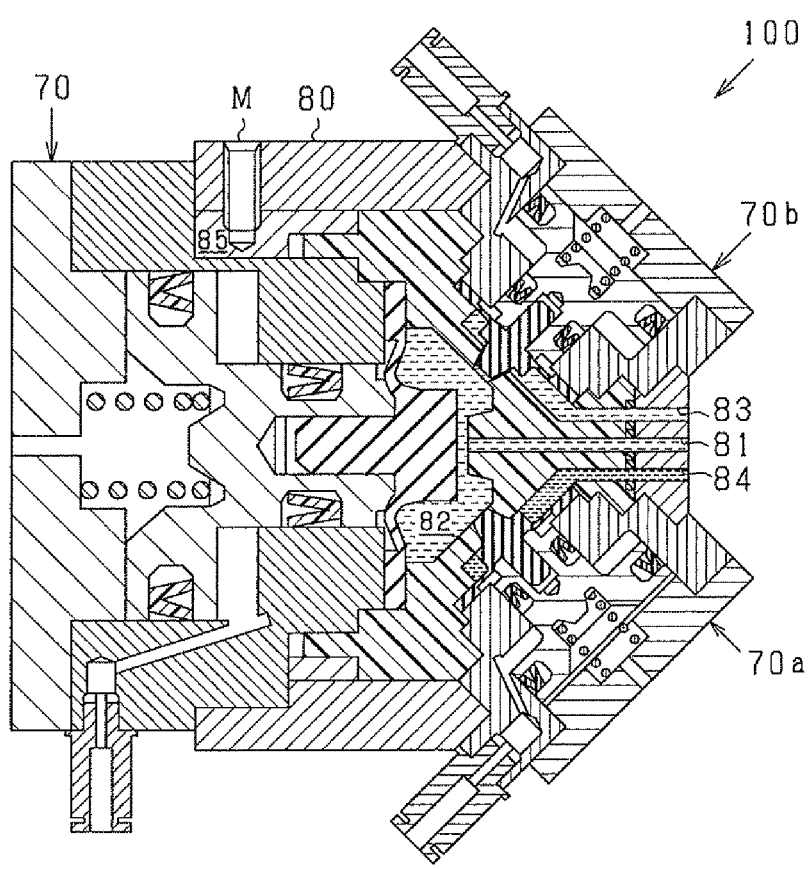
FIG. 13 is a cross-sectional view illustrating the flow state of the first chemical liquid in the chemical liquid flow channel switching apparatus 100.

FIG. 13 is a cross-sectional view illustrating the flow state of the first chemical liquid in the chemical liquid flow channel switching apparatus 100. The flow state of the first chemical liquid is a state in which the valve member actuator 70 and the valve member actuator 70b are actuated and the first chemical liquid flow channel 83 and the outlet flow channel 81 communicate with each other. As a result, the chemical liquid flow channel switching apparatus 100 functions as a valve causing the first chemical liquid to circulate.

Figure 14:
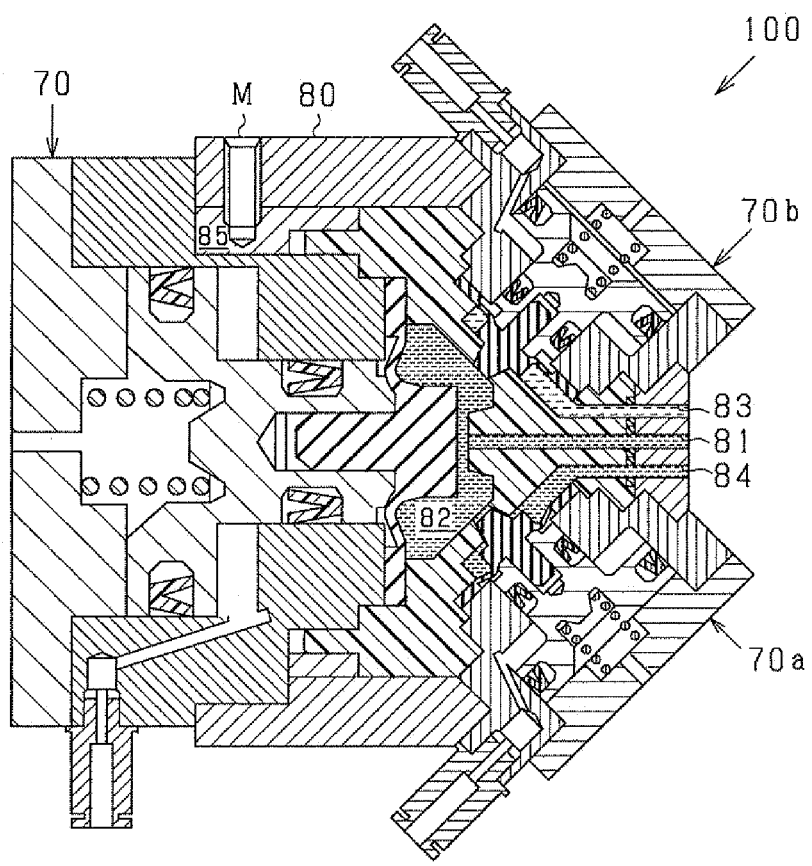
FIG. 14 is a cross-sectional view illustrating the flow state of the second chemical liquid in the chemical liquid flow channel switching apparatus 100.

FIG. 14 is a cross-sectional view illustrating the flow state of the second chemical liquid in the chemical liquid flow channel switching apparatus 100. The flow state of the second chemical liquid is a state in which the valve member actuator 70 and the valve member actuator 70a are actuated and the second chemical liquid flow channel 84 and the outlet flow channel 81 communicate with each other. As a result, the chemical liquid flow channel switching apparatus 100 functions as a valve causing the second chemical liquid to circulate.

The flow state of the first chemical liquid can be switched to the flow state of the second chemical liquid in the following manner.

(1) The valve member actuator 70 and the valve member actuator 70b are actuated to cut off all of the flow channels.

(2) Two valve member actuators 70c, 70d are actuated and the first chemical liquid is discharged from the inside of the flow channel switching chamber 82 by purging with the purge gas.

(3) The valve member actuator 70 and the valve member actuator 70a are actuated to set a communication state of the second chemical liquid flow channel 84 and the outlet flow channel 81.

Thus, in the chemical liquid flow channel switching apparatus 100 according to the second embodiment, five valve member actuators 70, 70a, 70b, 70c, 70d are mounted on the valve body 60 so that the valve member actuators themselves grasp the valve body 60. Therefore, the design of flow channel inside the valve body 60 can be freely realized. Thus, the valve chamber formed by the valve member actuator 70a can be directly communicated with the flow channel switching chamber 82 formed by the valve member actuator 70. As a result, the diaphragm valve members 72a, 72b, 72c, 72d of the other valve member actuators 70a, 70b, 70c, and 70d are inserted into the flow channel switching chamber 82 and the gas purging efficiency is greatly improved.

(D. Constitution and Operation of Flow Meter of the Third Embodiment)

Figure 15:
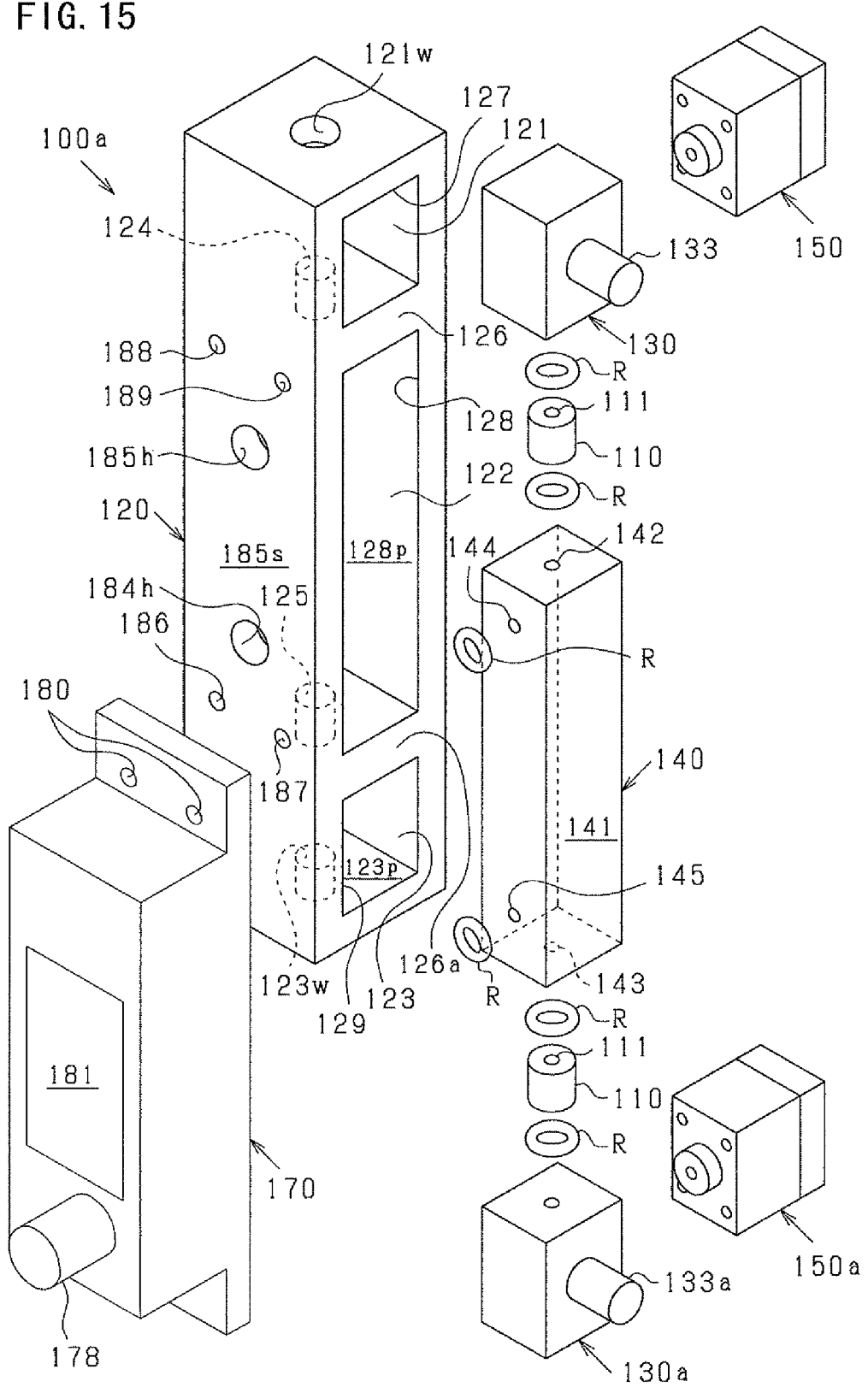
FIG. 15 is a perspective view illustrating a constitution of flow meter 100a of the third embodiment.
Figure 16:
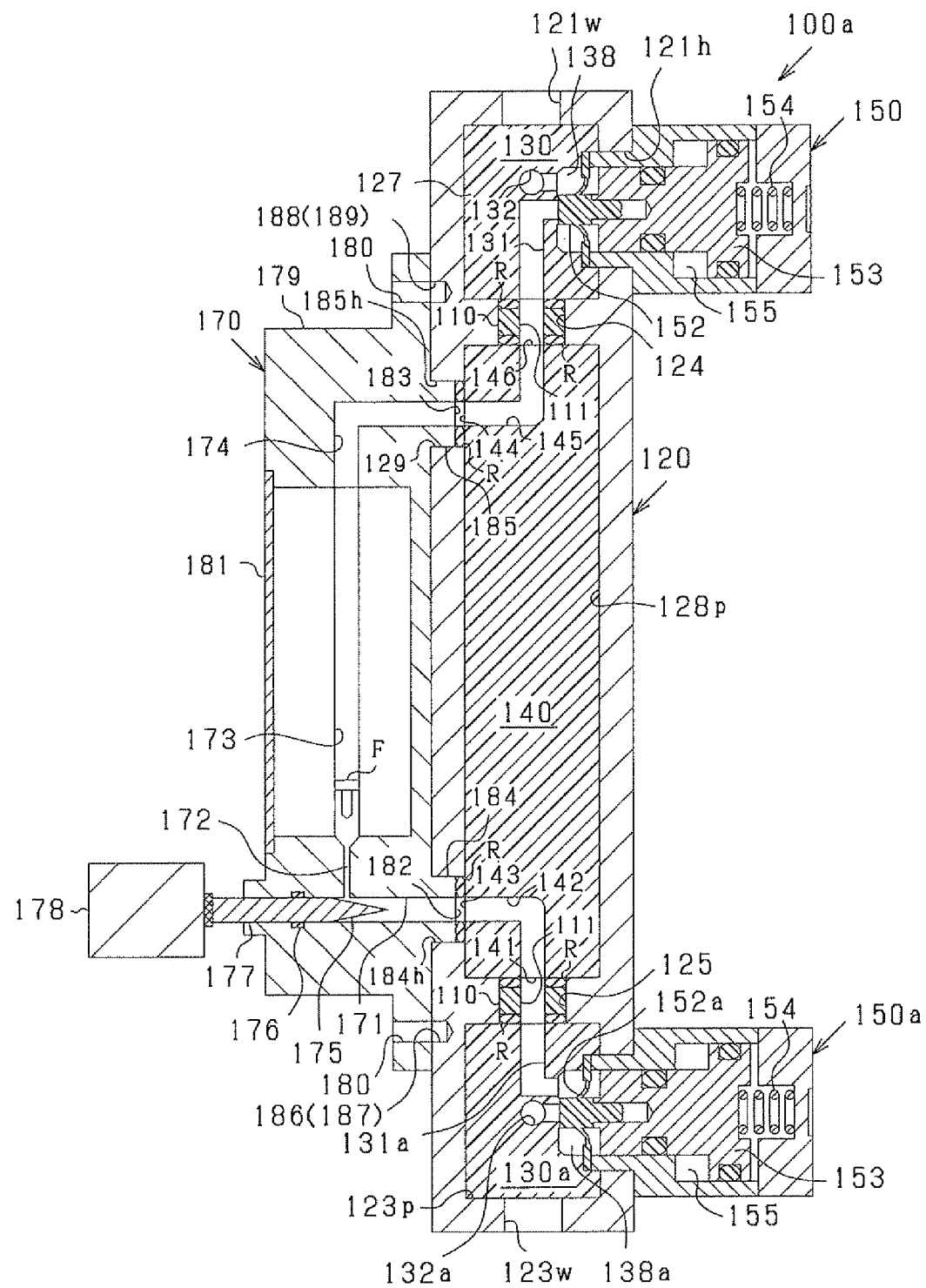
FIG. 16 is a cross-sectional view illustrating a constitution of flow meter 100a of the third embodiment.

FIG. 15 is a perspective view illustrating a constitution of flow meter 100a of the third embodiment. FIG. 16 is a cross-sectional view illustrating a constitution of flow meter 100a of the third embodiment. The flow meter 100a has a measuring unit 170, two valve bodies 130, 130a, a flow channel member 140, a frame member 120, two valve member actuators 150, 150a, two joint channel members 110, six O-rings R.

The measuring unit 170 is an area flow meter so-called "purge meter". The flow rate is measured by reading the position of the float F of the measuring unit 170. The measuring unit 170 has an inflow channel 171, a connecting channel 172, the float F, a taper tube 173, an outflow channel 174, a chassis 179, a glass window 181, a needle 175, a sealing member 176, an adjusting axis 177, and an adjusting knob 178.

The inflow channel 171 has an inflow opening 182 into which the fluid flows and extends horizontally. The connecting channel 172 extends vertically and communicated with the inflow channel 171. The outflow channel 174 has a vertical portion communicated with the taper tube 173 and a horizontal portion extending horizontally with an outflow opening 183. The chassis 179 has an inflow side protruding portion 184 with the inflow opening 182 and an outflow side protruding portion 185 with the outflow opening 183.

The internal channels of the measuring unit 170 are connected as follows. The fluid as a measurement object flows from the inflow opening 182 to the inflow channel 171. The needle 175 can adjust the flow rate by adjusting the orifice diameter at the communication point of the inflow channel 171 and the connecting channel 172. The needle 175 is rotated by the adjusting knob 178 via the adjusting axis 177 and can control the orifice diameter with the not shown screw connection in the chassis 179.

The taper tube 173 has an internal channel having a taper with an internal diameter gradually widening towards to the outflow channel 174. The taper tube 173 is located such that the axis of direction is aligned to the vertical direction with the outflow channel 174 located upper side. The float F is movably inserted in the internal channel of the taper tube 173 such that the float F moves downstream (upper side of vertical direction) with a wider internal diameter in response to the increase of flow rate, and the float F moves upstream (lower side of vertical direction) with a narrower internal diameter in response to the decrease of flow rate. The taper tube 173 enables the measurement of flow rate inside the internal channel in the taper tube 173 by reading the position of the float F through the glass window 181.

The frame member 120 has a shape of rectangular cuboids and has a first storing space 121, a second storing space 122, and a third storing space 123 aligned in one line in the rectangular cuboids as shown in FIG. 15. Each of the first storing space 121, the second storing space 122, and the third storing space 123 has a shape of rectangular cuboids. Each of the first storing space 121, the second storing space 122, and the third storing space 123 has a first opening 127, a second opening 128, and a third opening 129 in the same direction, respectively. The first storing space 121, the second storing space 122, and the third storing space 123 have rectangular pillar shapes with bases of the first opening 127, the second opening 128, or the third opening 129, respectively.

The frame member 120 has a installation surface 185s for installing the measuring unit 170. The installation surface 185s has threaded screw holes 186 to 189 for the fastening screw to install the measuring unit 170 and two through-holes 184h, 185h. The threaded screw holes 186 to 189 and the two through-holes 184h, 185h are communicated from the installation surface 185s to the second storing space 122. The measuring unit 170 is installed to the frame member 120 with the inflow side protruding portion 184 and the outflow side protruding portion 185 inserted into the through-hole 184h and the through-hole 185h, respectively as shown in FIG. 16.

The second storing space 122 is separated from the first storing space 121 and the third storing space 123 with the internal wall 126 and the internal wall 126a, respectively. The second storing space 122 is communicated with the first storing space 121 and the third storing space 123 via the through-hole 124 running through the internal wall 126 and via the through-hole 125 running through the internal wall 126a, respectively.

The first storing space 121 has a through-hole 121w having a common axis with the through-hole 124. The third storing space 123 has a through-hole 123w having a common axis with the through-hole 125. The through-hole 121w and through-hole 123w are through-holes for inserting a drill (not shown) for drilling the through-hole 124 and the through-hole 125.

The first storing space 121, the second storing space 122, and the third storing space 123 store the first valve body 130, the second valve body 130a, and the flow channel member 140, respectively. Each of the first valve body 130, the second valve body 130a, and the flow channel member 140 has a shape of rectangular pillar which fits to the first opening 127, the second opening 128, and the third opening 129, respectively.

With this structure, the first valve body 130, the second valve body 130a, and the flow channel member 140 can be inserted through the first opening 127, the second opening 128, and the third opening 129 smoothly and stored in the first storing space 121, the second storing space 122, and the third storing space 123, respectively The flow channel member 140 has two internal channels 142, 145. The internal channel 142 has two openings 141, 143 and connects each other.

The internal channel 145 has two openings 144, 146 and connects each other. The flow channel member 140 is located at a position where the opening 143 and the opening 144 are communicated to the inflow opening 182 and the outflow opening 183 of the measuring unit 170, respectively.

The measuring unit 170 is installed when the flow channel member 140 is positioned as described above inside the second storing space 122 of the frame member 120. The measuring unit 170 is installed by inserting the inflow side protruding portion 184 and the outflow side protruding portion 185 into the through-hole 184h and the through-holes 185h, respectively with each O-ring R provided in the through-hole 184h and the through-holes 185h, respectively. This installation is accomplished with fastening members (not shown) which run through the four through-holes 180 of the measuring unit 170 and screwed in the threaded screw holes 186 to 189.

With this structure, the inflow opening 182 and the outflow opening 183 of the measuring unit 170 are communicated with the opening 143 and the opening 144 of the flow channel member 140 via O-rings R, respectively. On the other hand, the flow channel member 140 is pressed against the internal contact surface 128p which forms a part of internal wall of the second storing space 122 via O-ring R. In other words, the flow channel member 140 is held between the inflow side protruding portion 184, the outflow side protruding portion 185, and the internal contact surface 128p via O-rings R.

The first valve body 130 has two chemical fluid channels 131, 132 and the chemical fluid valve chamber 138 communicated with the two chemical fluid channels 131, 132. The diaphragm valve member 152 is installed inside of the chemical fluid valve chamber 138. The diaphragm valve member 152 is driven to switch enable or disable a mutual communication of the two chemical fluid channels 131, 132. The chemical fluid channel 132 communicates with the internal channel (not shown) of the resin joint 133 (see FIG. 15). The chemical fluid channel 131 communicates with the internal channel 145 of the flow channel member 140 via the internal channel 111 of the joint channel member 110 and two O-rings.

The second valve body 130a has two chemical fluid channel 131a, 132a and the chemical fluid valve chamber 138a communicated with the two chemical fluid channel 131a, 132a. The diaphragm valve member 152 is installed inside of the chemical fluid valve chamber 138a. The diaphragm valve member 152 is driven to switch enable or disable a mutual communication of the two chemical fluid channels 131a, 132a. The chemical fluid channel 132a communicates with the internal channel (not shown) of the resin joint 133a. The chemical fluid channel 131a communicates with the internal channel 142 of the flow channel member 140 via the internal channel 111 of the joint channel member 110 and two O-rings R.

The valve member actuator 150 has a similar structure as the valve member actuator 50. The valve member actuator 150 has a diaphragm valve member 152, a piston 153 which drives the diaphragm valve member 152, a pressure chamber 155, and a spring 154. The pressure chamber 155 applies a drive force to the piston 153 in the direction to disable the mutual communication of the internal channel. The spring 154 press the piston 153 in the reverse direction of the pressure chamber 155. The valve member actuator 150a has the same structure as the valve member actuator 150. The valve member actuators 150, 150a have similar structures as the valve member actuators 50 and constitute shutoff valves with the first valve body 130 and the second valve body 130a.

The first storing space 121, the second storing space 122, and the third storing space 123 are located in alignment with an axis direction of the joint channel member 110. Thus, two O-rings provided at the ends of each of the two joint channel members 110 press the first valve body 130 and the second valve body 130a to move apart each other. The second valve body 130a is pressed against the internal contact surface 123p which forms a part of internal wall of the third storing space 123. The first valve body 130 is pressed against the internal contact surface (not shown) which forms a part of internal wall of the first storing space 121.

With this structure, the joint channel member 110 and sealing elastic member (e.g. O-ring R) implement the mutual communications of the members 130, 130a, 140 by pressing the members 130, 130a, 140 stored in the plurality of storing spaces 121 to 123 of the frame member 120, respectively. The joint channel member 110 and sealing elastic member (e.g. O-ring R) function to fix the members 130, 130a, 140 inside the plurality of storing spaces 121 to 123 of the frame member 120.

The frame member 120 is configured to have the plurality of storing spaces 121 to 123 as described above. In this kind of structure with the plurality of storing spaces 121 to 123, it is possible to form the through-holes 124, 125 and connect the internal channels with the joint channel member 110 and sealing elastic member (e.g. O-ring R) inside the through-hole 124, 125. Additionally, the measuring unit 170 which is a functional device is installed outside of the frame member 120, which is easily detached for maintenance.

This embodiment enables the change of direction of the resin joint 133, 133a by exchanging the first valve body 130 and/or the second valve body 130a with other valve bodies. This realizes easy changes of external connection points.

Additionally, the first valve body 130, the second valve body 130a, and the flow channel member 140 are connected with the joint channel member 110 each other. It saves space because these connections are accomplished without the resin joint parts connections. The valve body 130, 130a are also referred to as a main circuit member. The valve member actuator 150 is also referred to as a sub-circuit member.

(E. Constitution and Operation of Switching Valve of the Fourth Embodiment)

Figure 17:
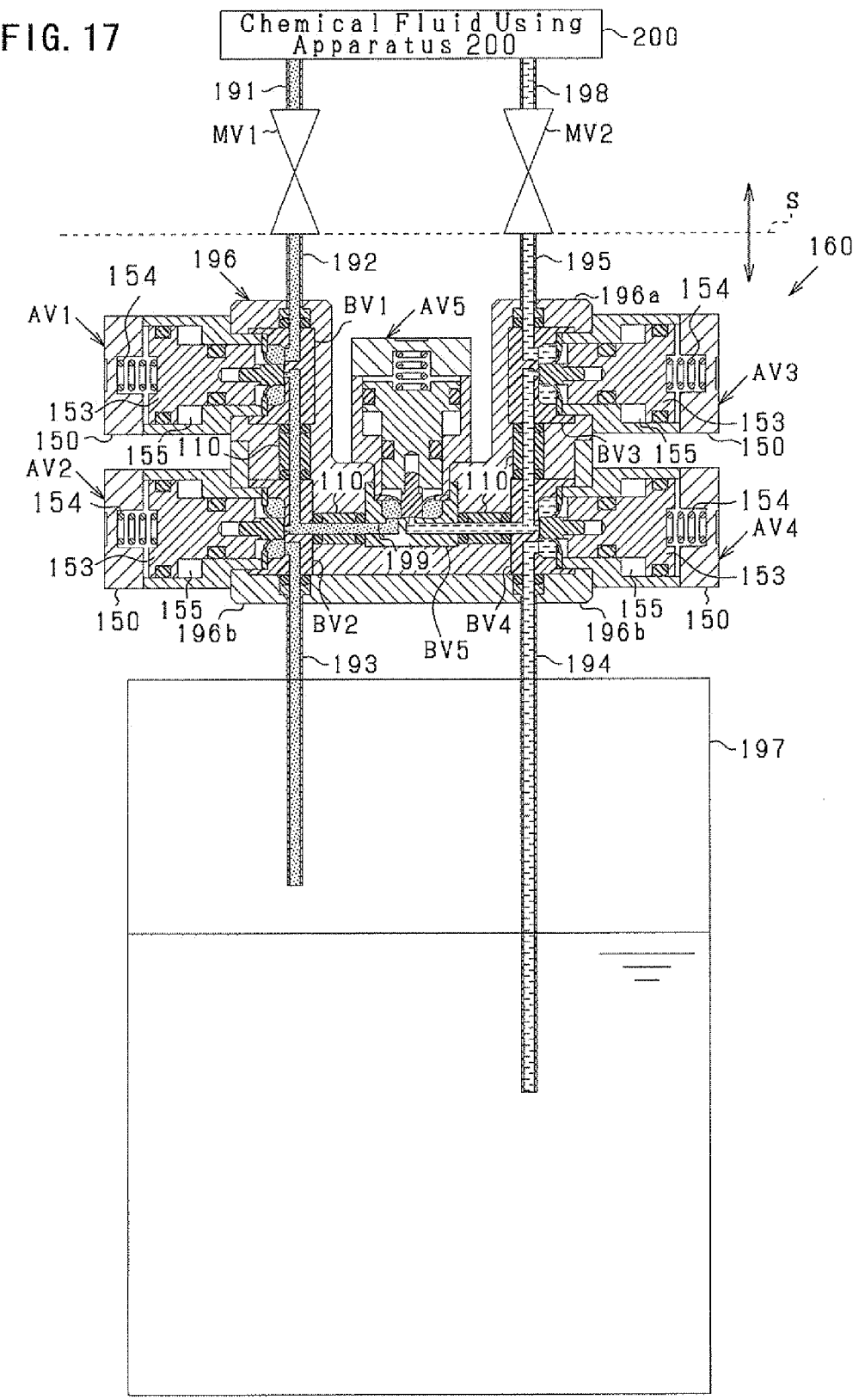
FIG. 17 is a frame format illustrating constitutions of chemical fluid channel switching valve 160 and chemical fluid tank 197 of the fourth Embodiment.

FIG. 17 is a frame format illustrating constitutions of chemical fluid channel switching valve 160 and chemical fluid tank 197 of the Fourth Embodiment. The chemical fluid switching valve 160 is equipped with the chemical fluid tank 197. The chemical fluid switching valve 160 switches the channel for the chemical fluid supply to the chemical fluid using apparatus 200 or the chemical fluid refill to the chemical fluid tank 197.

The chemical fluid switching valve 160 is connected to the chemical fluid using apparatus 200 via the channel pipes 191, 198 equipped with the shutoff valves MV1, MV2, respectively. The chemical fluid using apparatus 200 and the chemical fluid switching valve 160 are connected and separated at the dashed line S between the shutoff valves MV1, MV2 and chemical fluid switching valve 160.

The chemical fluid switching valve 160 has the frame member 196, five shutoff valves AV1 to AV5 installed to the frame member 196, four joint channel member 110 with O-rings, and the joint equipped channel pipes 192 to 195. Each of five shutoff valves AV1 to AV5 has a each of five valve bodies BV1 to BV5 and the valve member actuator 150, respectively.

The frame member 196 has openings for inserting five valve bodies BV1 to BV5 and five storing spaces, each of which has a shapes of rectangular pillar with the shape of openings as the base of the pillar. The frame member 196 has pillar member 196a and pillar member 196b jointed with the pillar member 196a. The pillar members 196a, 196b have horseshoe shapes as the base of their pillar. The pillar member 196a has three storing spaces at the direction of three o'clock, six o'clock, and nine o'clock. Two storing spaces are formed between the pillar member 196a and the pillar member 196b. The joint method may be made with screws or by welding (not shown). The frame member 196 may be made of metal or resin material with enough strength for strong acid as chemical fluid, for example.

Each outside wall of five storing spaces has a through-hole for inserting a part of each of five valve member actuators 150. The outside walls are dividing walls which divides the external direction and each storing space in the direction perpendicular to the axis of a pillar shape of the frame member 196.

Each of five valve bodies BV1 to BV5 is inserted in each of five storing spaces of the frame member 196. Five valve bodies BV1 to BV5 are fixed by four joint channel members 110 and five valve member actuators 150 in the each storing space of the frame member 196. The internal channels of five valve bodies BV1 to BV5 are connected each other with four joint channel members 110, forming the internal channels of the chemical fluid switching valve 160.

The joint equipped channel pipes 192 to 195 are installed to the frame member 196. The joint equipped channel pipe 193 is inserted in the chemical fluid tank 197 with its opening located above the fluid level of chemical fluid in the chemical fluid tank 197. The joint equipped channel pipe 194 is inserted in the chemical fluid tank 197 with its opening located below the fluid level of chemical fluid. With this structure, it is possible to supply the chemical fluid from the joint equipped channel pipe 194 by injecting nitrogen gas into the joint equipped channel pipe 193.

Two shutoff valves AV1, AV2 operates enable or disable of the communication from the joint equipped channel pipe 192 to the joint equipped channel pipes 193 for providing nitrogen gas. Two shutoff valves AV3, AV4 operates enable or disable of the communication from the joint equipped channel pipe 194 to the joint equipped channel pipe 195 for providing the chemical fluid. The shutoff valve AV5 operates enable or disable of the communication of a bypass channel 199 that connects the nitrogen channel and the chemical fluid channel.

Figure 18:
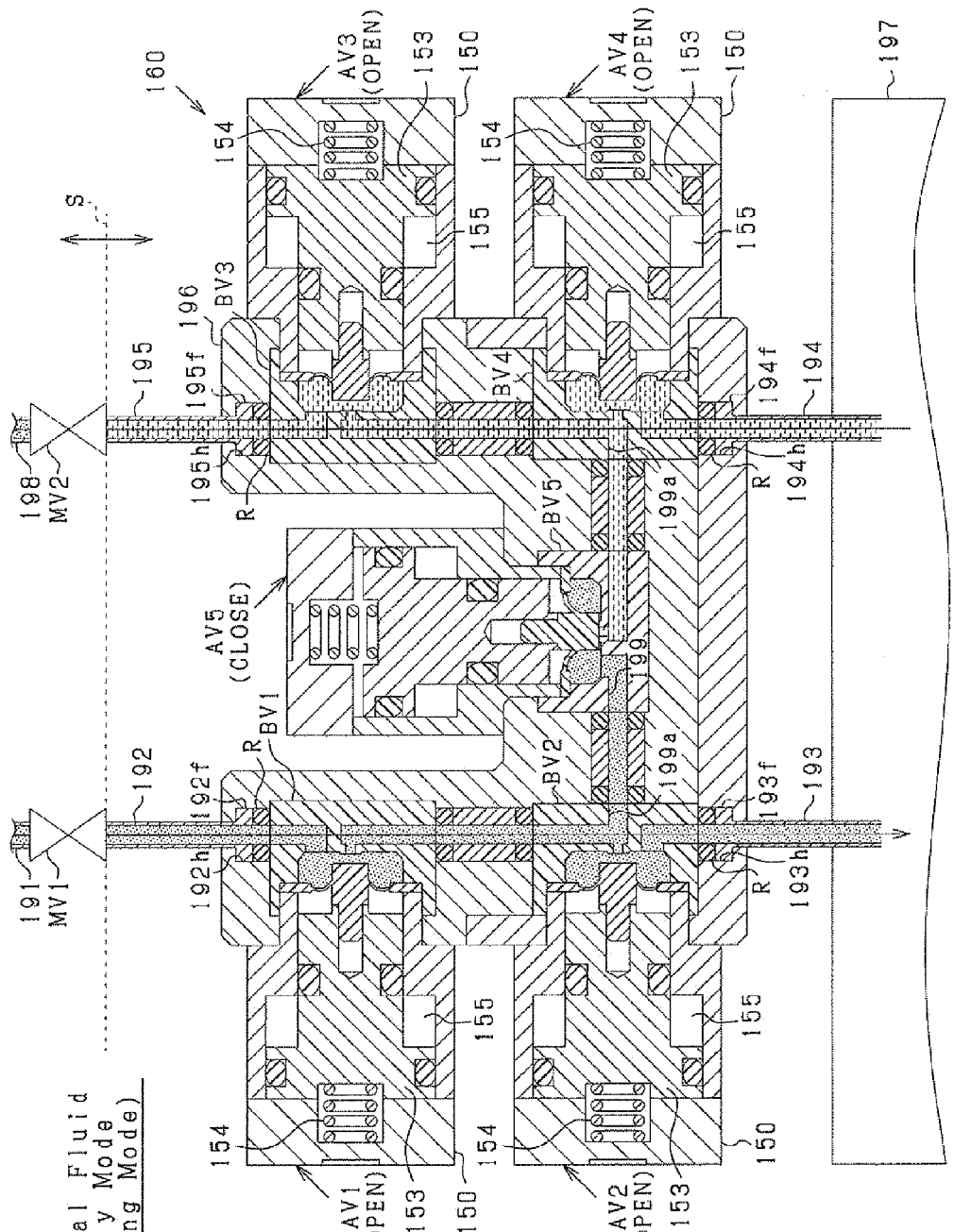
FIG. 18 is an enlarged view illustrating a constitution of chemical fluid channel switching valve 160 in chemical fluid supply mode.

FIG. 18 is an enlarged view illustrating a constitution of chemical fluid channel switching valve 160 in chemical fluid supply mode. The joint equipped channel pipes 192 to 195 have flanges 192f to 195f that radically flare at their ends. Each of the flanges 192f to 195f are installed in each of annular grooves 192h to 195h formed in the frame member 196. The annular groove 192h is located in the frame member 196 away from the annular groove 193h in the height direction of pillar shape of the frame member 196 or "height wise-shifted location" from the annular groove 193h. The annular groove 194h is located in the frame member 196 away from the annular groove 195h in the height direction of pillar shape of the frame member 196 or "height wise-shifted location" from the annular groove 195h.

The frame member 196 has a through-hole (not shown) formed along the axis direction of the annular groove 192h. The joint equipped channel pipe 192 with the flange 192f is installed with the O-ring R using the through-hole. The through-hole is formed in the height wise-shifted location from the annular groove 193h. The frame member 196 has other similar through-holes (not shown) located in the height wise-shifted location each other, for the joint equipped channel pipes 193 to 195.

Three valve bodies BV1, BV3, BV5 have common constitutions. Two valve bodies BV2, BV4 have common constitutions. Two valve bodies BV2, BV4 are different from three valve bodies BV1, BV3, BV5 in that connecting channels 199a are additionally formed in the two valve bodies BV2, BV4. Two valve bodies BV2, BV4 and three valve bodies BV1, BV3, BV5 have common constitutions except the connecting channels 199a. Accordingly, Two valve bodies BV2, BV4 can be fabricated just by adding "hole making process" to form the connecting channels 199a in the three valve bodies BV1, BV3, BV5.

Figure 19:
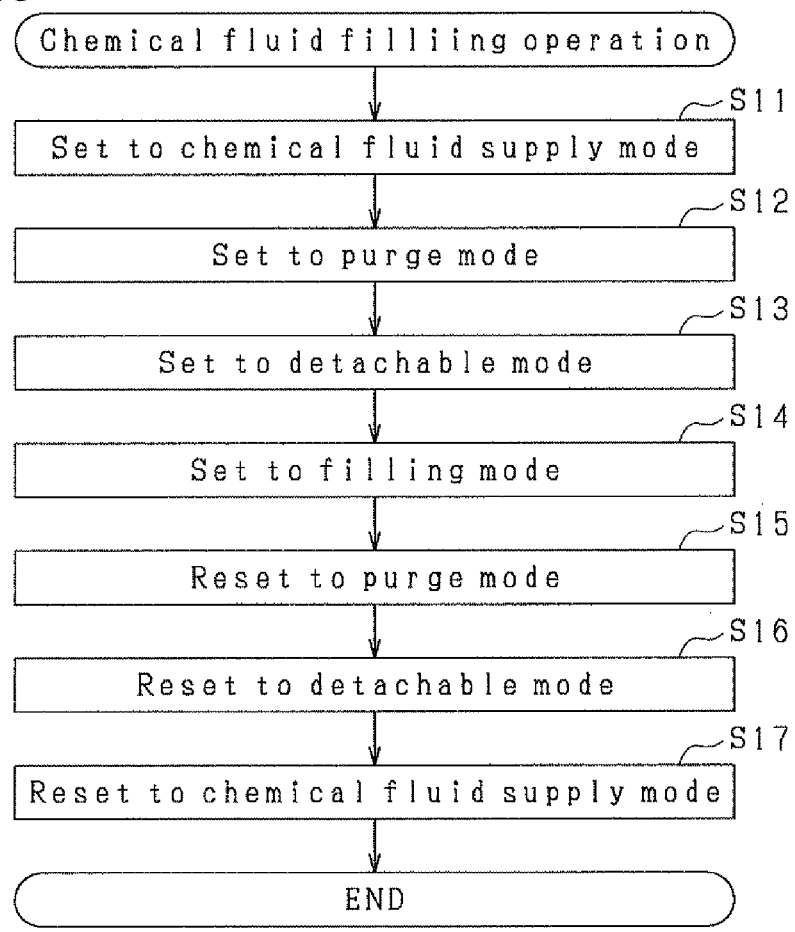
FIG. 19 is a flowchart showing an operation (mode switching) of chemical fluid filling by the chemical fluid channel switching valve 160.

FIG. 19 is a flowchart showing an operation (mode switching) of chemical fluid filling by the chemical fluid channel switching valve 160. At the step S11, the chemical fluid switching valve 160 is set to the chemical fluid supply mode. The chemical fluid supply mode is a state to allow a supply of the chemical fluid to the chemical fluid using apparatus 200. In the use state of chemical fluid, four shutoff valves AV1 to AV4 are operated to open state and one shutoff valve AV5 is operated to close state as shown in FIG. 18.

In this operation state, the nitrogen gas can be brought to the chemical fluid tank 197 via two shutoff valves AV1, AV2 in open state and the channel pipe 191, and the chemical fluid can be brought to the channel pipe 198 from the chemical fluid tank 19 via two shutoff valves AV3, AV4 in open state. Meanwhile, the shutoff valve AV5 close the bypass channel 199 connected between the channel pipe 191 and the channel pipe 198.

Figure 20:
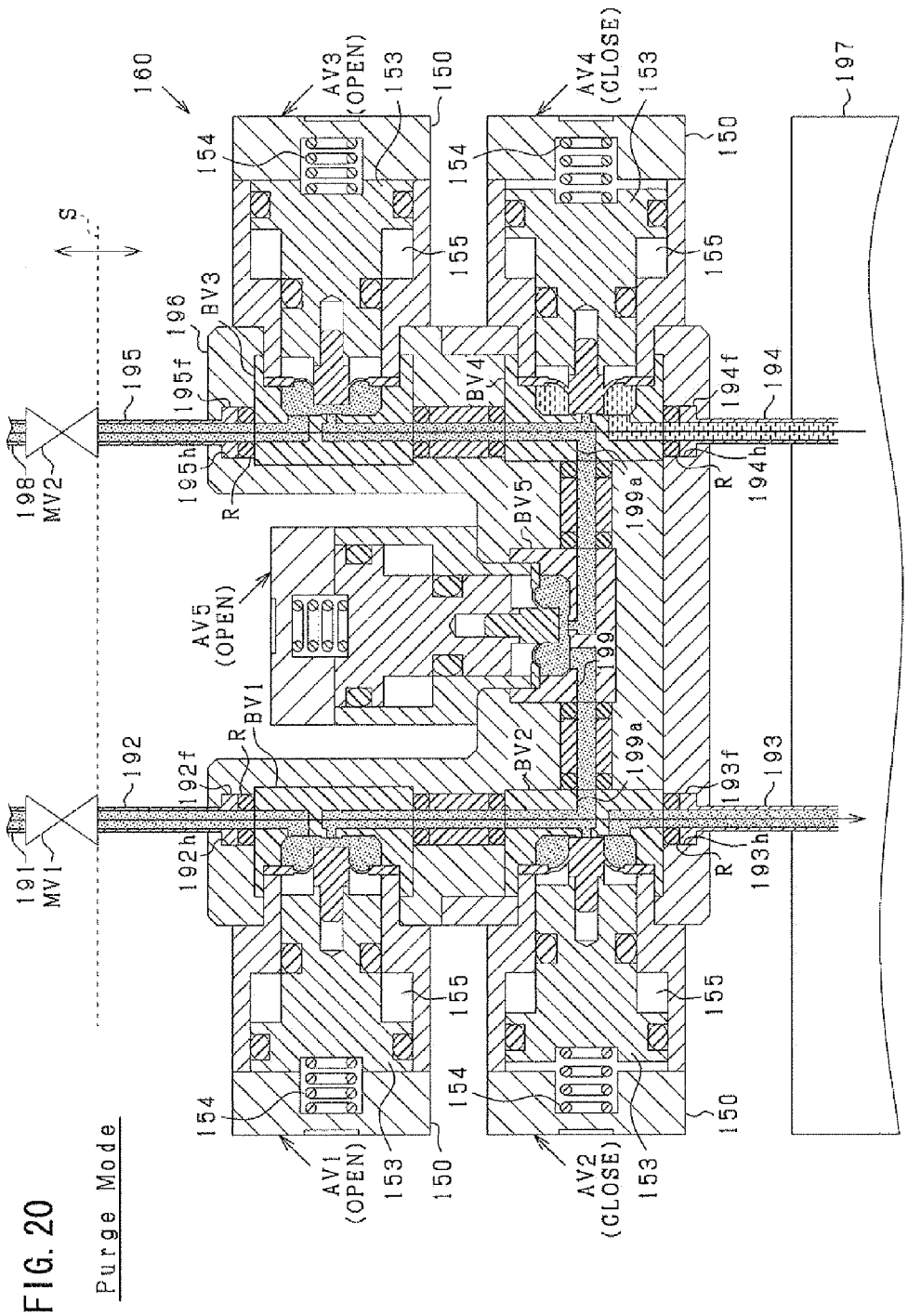
FIG. 20 is an enlarged view illustrating chemical fluid channel switching valve 160 in purge mode.

At the step S12, the chemical fluid switching valve 160 is set to the purge mode. The purge mode is an operation state for purging the residual chemical fluid in the internal channels of the chemical fluid switching valve 160 as shown in FIG. 20. In the purge mode, the chemical fluid tank 197 is sealed by setting shutoff valves AV2, AV4 to close state, and the shutoff valve AV5 is set to open state with two shutoff valves AV1, AV3 kept in open state. With this constitution, it is possible to purge the chemical fluid from the internal channel of the chemical fluid switching valve 160 by injecting the nitrogen gas with the chemical fluid tank 197 kept sealed.

Figure 21:
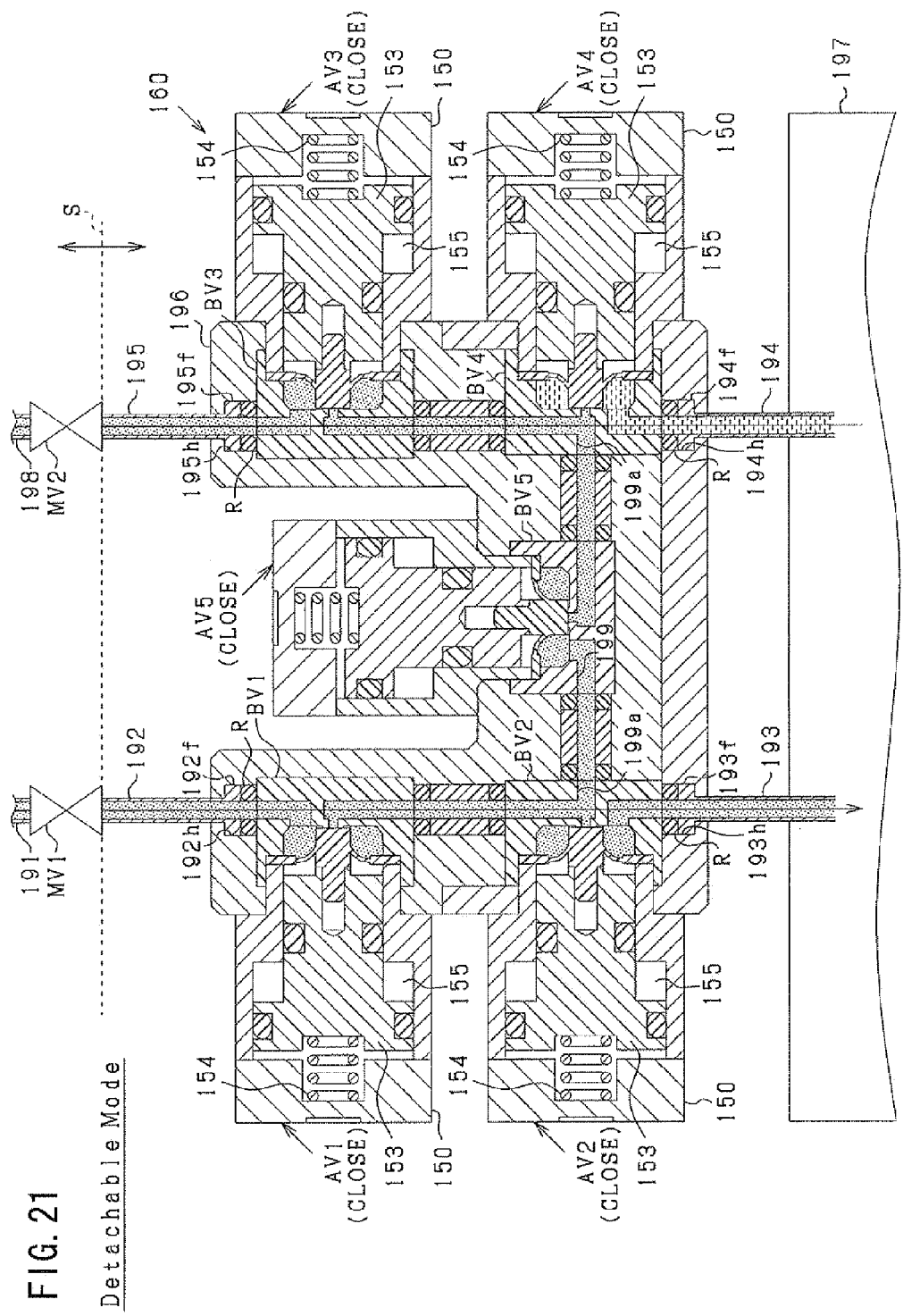
FIG. 21 is an enlarged view illustrating chemical fluid channel switching valve 160 in detachable mode.
Figure 22:
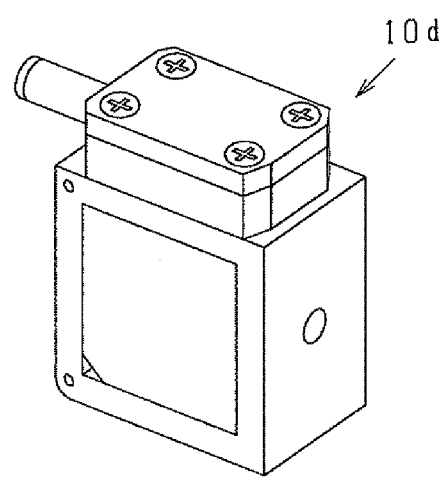
FIG. 22 is a perspective view illustrating a valve unit 10d of a variation example.
Figure 23:
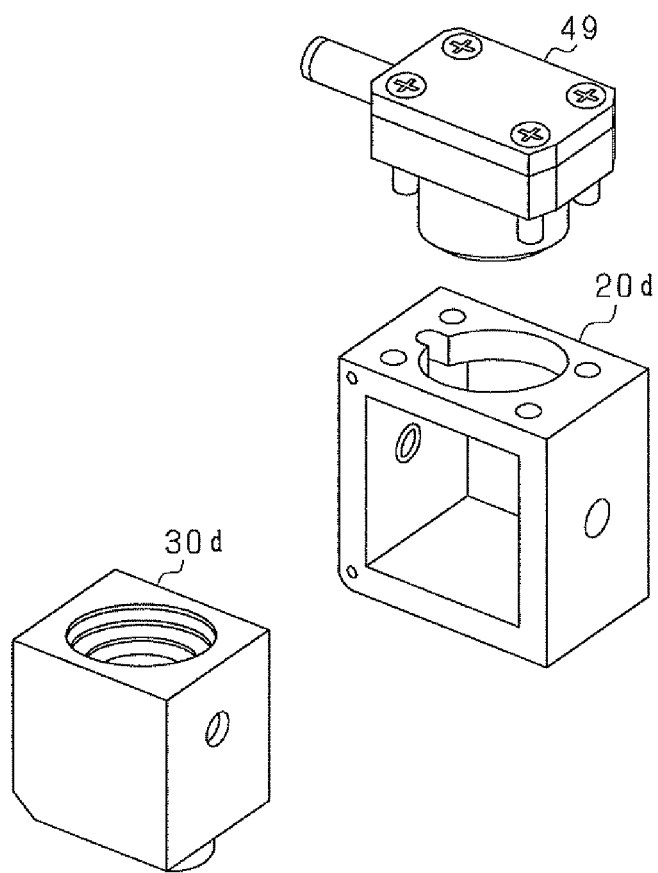
FIG. 23 is an exploded perspective view illustrating the constituent components of the valve unit 10d of a variation example.
Figure 24:
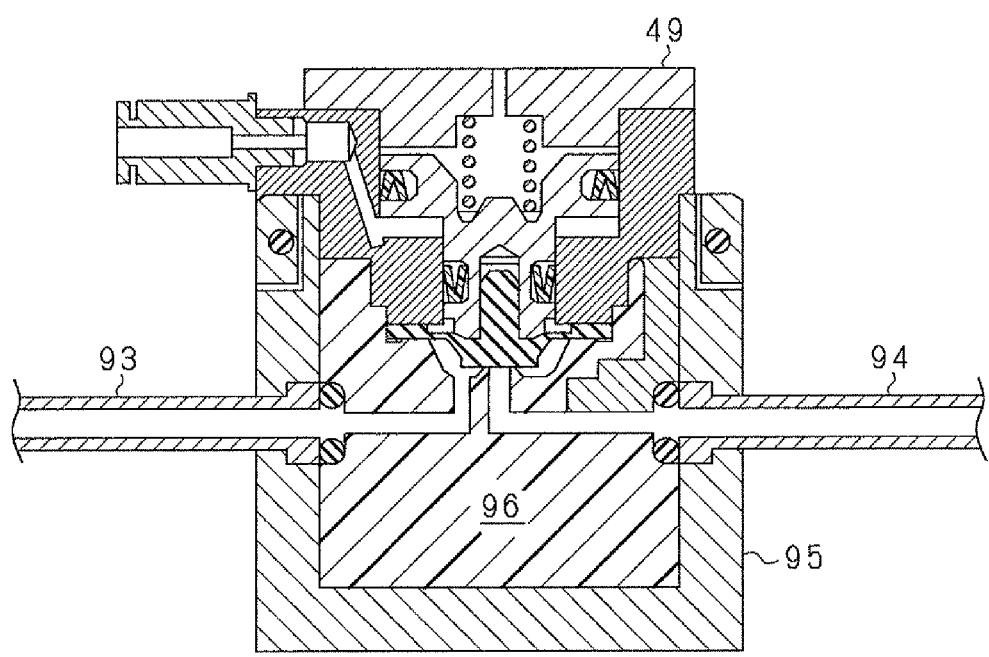
FIG. 24 is a cross-sectional view illustrating the internal flow channel of a variation example.
Figure 25:
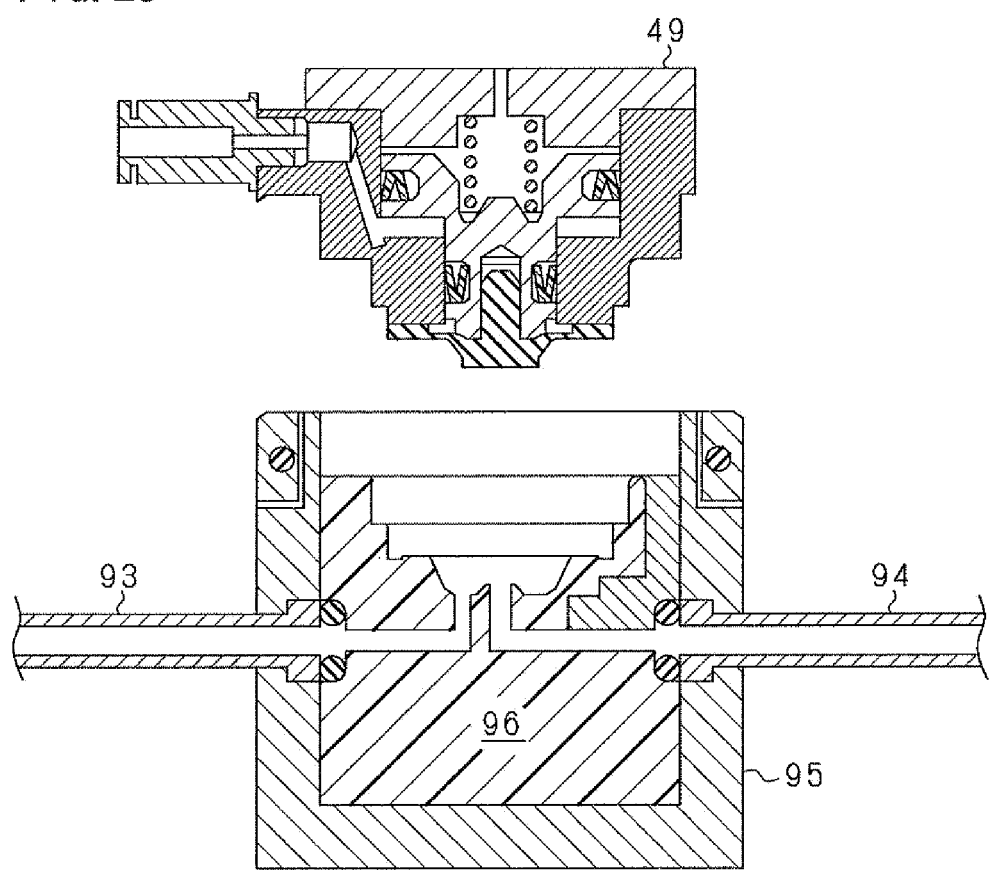
FIG. 25 is a cross-sectional view illustrating the constituent components of the internal flow channel of the variation example.

At the step S13, the chemical fluid switching valve 160 is set to the detachable mode. The detachable mode is an operation state for detaching the chemical fluid switching valve 160 from the chemical fluid using apparatus 200 as shown in FIG. 21. The chemical fluid using apparatus 200 is detached at the downstream or "the chemical fluid tank 197 side" of the two shutoff valve MV1, MV2. The detachable mode is an operation state to seal the internal channels of the chemical fluid switching valve 160 off from the outside, with all of the shutoff valves AV1 to AV5 in close state by setting the shutoff valves AV1, AV3, and AV5 to close state.

The chemical fluid switching valve 160 can be connected to a chemical fluid supply apparatus (not shown) in the detachable mode. The connection to the chemical fluid supply apparatus can be implemented with the same constitution for the connection to the chemical fluid using apparatus 200.

At the step 14, the chemical fluid switching valve 160 is set to the filling mode. The filling mode is the same operation mode as the chemical fluid supply mode (see FIG. 18). In this operation mode, the fluid flows in reverse direction of the chemical fluid supply mode. In other words, the chemical fluid is brought to the chemical fluid tank 197 via the two shutoff valves AV3, AV4 in open state and the nitrogen gas is discharged from the chemical fluid tank 197 via the two shutoff valves AV1, AV2 in open state. Meanwhile, the shutoff valve AV5 closes the bypass channel 199 connected between the channel pipe 191 and the channel pipe 198.

At the step S15, the chemical fluid switching valve 160 is set to the purge mode again or reset to the purge mode. This purge mode is the same operation state as the purge mode of step S12 (see FIG. 20) and is the operation state to allow the purge of the chemical fluid from the internal channel of the chemical fluid switching valve 160. In this state, the purge is performed. When the purge is completed, the operation advances to step S16.

At the step S16, the chemical fluid switching valve 160 is reset to the detachable mode. The detachable mode is the same operation state as the detachable mode of step S13 (see FIG. 21) and is the operation state to allow the detachment of the chemical fluid switching valve 160 from the chemical fluid supply apparatus (not shown) and the connection to the chemical fluid using apparatus 200.

At the step S17, the chemical fluid switching valve 160 is reset to the chemical fluid supply mode. With this constitution, the chemical fluid tank 197 can restart the supply of the chemical fluid to the chemical fluid using apparatus 200 from the chemical fluid tank 197 filled with the chemical fluid.

Accordingly, the chemical fluid switching valve 160 can fill the chemical fluid with the chemical fluid tank 197 kept sealed such that the chemical fluid is sealed off from the air. Additionally, this embodiment implemented the chemical fluid switching valve 160 with the simple constitution of five efficiently equipped shutoff valves AV1 to AV5.

In these above mentioned embodiments, the main circuit member (e.g. valve body and flow channel member) and the sub-circuit member (e.g. valve member actuator) are connected each other, without using metallic screw passing through the main circuit member. The inventor found that the chemical fluid of strong acid sinks in the resin material little by little with a long time and corrodes metallic screws close to the channel if the permeable resin material such as PTFE is fastened with the metallic screws. In the above mentioned embodiments, these kinds of corrosions are prevented because the metallic screws do not passing through or even contact the resin body.

(F. Other Preferred Constitutions)

The first constitution may be implemented by a chemical fluid flow channel coupling apparatus that couples and decouples chemical fluid flow channels. The coupling apparatus includes: a first coupling unit; and a second coupling unit. The first coupling unit includes: a first chemical fluid flow channel configured to flow the chemical fluid; a first coupling flow channel having a first coupling surface; a purging fluid supply flow channel for supplying a fluid for purging; a first chemical fluid valve member chamber being communicated with the first chemical fluid flow channel, the first coupling flow channel, and the purging fluid supply flow channel; a first valve member configured to open and close a first chemical fluid opening, the first chemical fluid opening being formed in a first inner wall surface of the first chemical fluid valve member chamber, the first chemical fluid opening being communicated with the first chemical fluid flow channel; and a purging fluid supply control valve configured to open and close the purging fluid supply flow channel. The second coupling unit includes: a second chemical fluid flow channel configured to flow the chemical fluid; a second coupling flow channel having a second coupling surface configured to allow a coupling and a decoupling to the first coupling surface; a purging fluid discharge flow channel configured to discharge the fluid for purging; a second chemical fluid valve member chamber being communicated with the second chemical fluid flow channel, the second coupling flow channel, and the purging fluid discharge flow channel; a second valve member configured to open and close a second chemical fluid opening, the second chemical fluid opening being formed in a second inner wall surface of the second chemical fluid valve member chamber, the second chemical fluid opening being connected to the second chemical fluid flow channel; and a purging fluid discharge control valve configured to open and close the purging fluid supply flow channel.

With this constitution, the communication of the first chemical liquid flow channel and the first chemical liquid valve member chamber can be opened and closed by the first valve member in the first chemical liquid opening formed in the inner wall surface of the first chemical liquid valve member chamber. As a result, in a state in which the first chemical liquid flow channel is isolated, the purging fluid can be caused to flow into the first coupling flow channel and the first chemical liquid valve member chamber and the chemical liquid can be discharged from the flow channel. The purging fluid supply flow channel can be opened and closed by the purging fluid supply control valve. Therefore, the first coupling flow channel can be operated to assume a state of connection only to the flow channel from which the chemical liquid has been discharged by the purging fluid in a decoupled state.

The second coupling unit has a constitution similar to that of the first coupling unit. Therefore, the second coupling flow channel of the second coupling unit can be also operated so as to be connected only to the flow channel from which the chemical liquid has been discharged by the purging fluid in a decoupled state. As a result, the leak of the chemical liquid in a decoupled state of the chemical liquid flow channel can be inhibited. The purging fluid may flow from the first coupling unit side to the second coupling unit or from the second coupling unit side to the first coupling unit.

The second constitution is modified in the first constitution as follows. The fluid for purging is a scavenging gas. The second coupling unit is disposed above the first coupling unit, with the gravity force direction being used as a reference direction. The first chemical fluid opening is disposed at a position higher than a first opening and lower than an second opening, the first opening being formed in the first inner wall surface and communicated with the purging fluid supply flow channel, the second opening being formed in the first inner wall surface and communicated with the first coupling flow channel, with the gravity force direction being used as a reference direction, and the second chemical fluid opening is disposed at a position higher than a third opening and lower than a fourth opening, the third opening being formed in the second inner wall surface and communicated with the second coupling flow channel, the fourth opening being formed in the second inner wall surface and communicated with the purging fluid discharge flow channel, with the gravity force direction being used as a reference direction.

With this constitution, the scavenging gas can flow in the opening leading from the purging fluid supply flow channel to the first inner wall opening, the first chemical liquid opening, the opening of the first inner wall surface leading to the first coupling flow channel, the opening leading from the first coupling surface, the second coupling surface, and the second coupling flow channel to the second inner wall surface, the second chemical liquid opening, and the opening of the second inner wall surface leading to the purging fluid discharge flow channel in the order of description. As a result, the liquid chemical liquid can be thoroughly discharged by the scavenging gas from bottom to top and a smooth discharge of the liquid chemical liquid can be realized.

The third constitution is modified in the first or second constitutions as follows. The first coupling unit further includes: a first valve body including the purging fluid supply flow channel, the first chemical fluid flow channel, and the first coupling flow channel; a first chemical fluid control valve having the first valve member, the first chemical fluid control valve and the purging fluid supply control valve being installed on the first valve body and contacting on the first valve body in each direction with a first load being applied to the first valve body; and a first frame member mounted on the first chemical fluid control valve and the purging fluid supply control valve, the first frame member having a shape such that a reaction force of the first load in each direction is transmitted from the outside of the valve body to the valve body. The second coupling unit further includes: a second valve body including the purging fluid supply flow channel, the second chemical fluid flow channel, and the second coupling flow channel, a second chemical fluid control valve having the second valve member, the second chemical fluid control valve and the purging fluid supply control valve being installed on the second valve body and contacting on the second valve body in each direction with a second load being applied to the first valve body; a second chemical fluid control valve having the second valve member, the second chemical fluid control valve and the purging fluid supply control valve being installed on the second valve body and contacting on the second valve body in each direction with a second load being applied to the second valve body.

With this constitution, the chemical liquid flow channel coupling apparatus is constituted by the valve body and a valve member actuator, and the valve member actuator is mounted by using the frame member having a shape such that the reaction force of the contact load is transmitted from the outside of the valve body to the valve body. As a result, the inner flow channel of the chemical liquid flow channel coupling apparatus can be easily reduced in size and linearized. Since the valve member actuator can be mounted on the valve body, without using tightening members (for example, bolts and nut) passing through the valve body, the presence of the tightening member is not an obstacle and a plurality of chemical liquid flow channels for chemical liquid circulation can be formed in the valve body.

The invention may be implemented as the fourth constitution below. A chemical liquid circuit apparatus includes: a main circuit member having a chemical liquid channel for flowing a chemical fluid and a main opening formed on an end of the chemical liquid channel; a sub-circuit member having a sealing surface for sealing the main opening from outside of the chemical liquid circuit apparatus, the sub-circuit member being installed on the main circuit member and contacting on main circuit member with a first load being applied to main circuit member; and a frame member having a storing space for storing the main circuit member and a connecting opening disposed in a position for connecting the main opening of the main circuit member stored in the storing space, the frame member having a shape such that a reaction force of the first load is transmitted from the storing space to the main circuit member.

With this constitution, the sub-circuit member (e.g. valve member actuator) is mounted by using the frame member having a shape such that the reaction force of the contact load is transmitted from the outside of the main circuit member (e.g. valve body) to the main circuit member. Therefore, the sub-circuit member can be mounted on the main circuit member, without using tightening members (for example, bolts and nuts) passing through the main circuit member. As a result, no obstacle is created by the presence of the tightening member, and a plurality of chemical liquid flow channels for chemical liquid circulation can be formed in the main circuit member.

The fifth constitution is modified in the fourth constitution as follows. The storing space includes: a mounting portion mounted on the sub-circuit member; and a support member having a contact surface facing the mounting portion, the contact surface transmitting the load to the main circuit member.

With this constitution, the sub-circuit member (e.g. valve member actuator) is mounted on the sub-circuit member by using the support member having a contact surface that faces the mounting portion of the sub-circuit member and transmits the load to the sub-circuit member. Therefore, the sub-circuit member can be mounted even in the case in which, for example, the sub-circuit member is mounted as a single unit on the sub-circuit member. When a plurality of the sub-circuit members are mounted, for example, at positions on both sides of the sub-circuit member, the frame member may be constituted such as to apply a load to the plurality of sub-circuit members, this load bringing the sub-circuit members close to each other.

The sixth constitution is modified in the fifth constitution as follows. The storing space includes an insert opening for inserting the main circuit member along the contact surface in order to install the main circuit member in the storing space.

With the sixth constitution, the insert opening for inserting the main circuit member along the contact surface is provided. Therefore, it is possible to insert the main circuit member into the storing space along the contact surface and to fix the main circuit member in the storing space keeping a contact on the contact surface after the insert.

The seventh constitution is modified in the sixth constitution as follows. The main circuit member has a valve body including a plurality of chemical liquid channel. The sub-circuit member has a valve member actuator including a valve member configured to switch enable or disable a mutual communication of the plurality of chemical liquid channel.

With the seventh constitution, the valve body including a plurality of chemical liquid channel is provided in the main circuit member, and the valve member configured to switch enable or disable a mutual communication of the plurality of chemical liquid channel is provided in the sub-circuit member. Therefore, it makes easy to fabricate the flow channel switching valve.

The eighth constitution is modified in the seventh constitution as follows. The plurality of chemical liquid flow channels include a first flow channel, a second flow channel, and a first valve member chamber that communicates the first flow channel and the second flow channel. The valve member actuator has: a first valve member provided inside the first valve member chamber and disables the communication between the first flow channel and the first valve member chamber by closing a first opening, the first opening being formed in the inner wall surface of the first valve member chamber and being connected to the first flow channel, and a second valve member configured to disable the communication between the second flow channel and the first valve member chamber by closing a second opening, the second opening being formed in the inner wall surface of the first valve member chamber and being connected to the second flow channel.

With the sixth constitutions, the first opening and the second opening formed in the first valve member chamber can be closed. Therefore, the chemical liquid can be prevented from remaining in the flow channel connected to the first valve body chamber. As a result, for example, the unintended mixing of chemical liquid when the flow channels are switched can be prevented.

The ninth constitution is modified in the eighth constitution as follows. The second flow channel has a second valve body chamber and a coupling flow channel connecting the second valve body chamber and the second opening. The first valve member is provided in a state of being able to open or close inside the first valve body chamber. The second valve member is provided in a state of being able to open or close inside the second valve body chamber and has a shape such that the second opening is closed when the second valve member is inserted into the coupling flow channel.

With the ninth constitution, it is possible to use only one valve member operating inside the first valve member chamber and therefore the constitution can be realized by selecting the appropriate flow channel arrangement. In addition since the second valve member has a shape such that the second opening is closed when the second valve member is inserted into the coupling flow channel, the volume of a concave portion which communicates with the first valve member chamber and in which the chemical liquid remains can be greatly reduced. As a result, the unintended mixing of chemical liquid during switched can be effectively inhibited.

The tenth constitution is modified in the ninth constitution as follows. The tenth constitution is provided with a plurality of sets of the second flow channel and the second valve member.

With the tenth constitution, the second valve member and the second flow channel communicating with the opening in the inner wall surface of the first valve member chamber are provided in a plurality of sets. Therefore, the constitution of each set can be used for an application such as switching of chemical liquid or purging during switching.

The eleventh constitution is modified in the ninth or tenth constitution as follows. The first valve member is a diaphragm valve member having a diaphragm membrane portion with a circumferential edge portion fixed to the valve body, and a protruding portion provided in the center of the diaphragm membrane portion to open and close the first opening, and the second flow channel is formed and disposed in a state of being open in each annular portion formed by partitioning by the diagraph membrane portion in the first valve member chamber.

With the eleventh constitution, a plurality of openings can be formed by efficiently using the shape of the valve chamber formed by the diaphragm membrane portion.

The twelfth constitution is modified in the fourth or fifth constitution as follows. The sub-circuit member has a state quantity sensor configured to sense a state quantity of the chemical fluid flowing in the main opening.

The thirteenth constitution is modified in the fourth or fifth constitution as follows. The sub-circuit member has a state controller configured to control a state quantity of the chemical fluid flowing in the main opening.

With the twelfth or thirteenth constitution, the sub-circuit member that is more easily detachable than main circuit member has the state quantity sensor and/or the state controller. This constitution facilitates maintenance of the state quantity sensor and/or the state controller. The state quantity sensor is a flow meter or a thermometer, for example. The state controller is a pressure controller or a flow controller, for example.

The fourteenth constitution is modified in one of the fourth to twelfth constitution as follows. The frame member has a plurality of the storing space, each of the plurality of storing space storing each of the main circuit members. The sub-circuit member includes a joint channel connecting the main openings of main circuit members stored in the storing spaces.

With the fourteenth constitution, each of the main circuit members are stored in the each of the storing space, and the sub-circuit member includes a joint channel connecting the main openings of main circuit members. Therefore, it allows simple and easy design of chemical fluid having the plurality of main circuit member.

(G. Variations)

The present invention is not limited to the above-described embodiments and can be also carried out in the following manner.

(1) In the above-described embodiments, the present invention is realized as a device having a function of cutting off or switching the flow channels. However, the present invention may be also realized simply as a valve performing ON/OFF switching or opening adjustment, as a valve unit 10*d* shown by way of example in FIG. 22, FIG. 23, FIG. 24, and FIG. 25. The valve unit 10*d* has a single valve member actuator 40, a valve body 96, and a frame member 95 and performs ON/OFF switching and opening adjustment between two chemical liquid flow channels 93, 94.

The merit of applying the present invention to such a valve unit is that the valve unit can be miniaturized and manufactured in a simpler manner. With such a constitution, a plurality of chemical liquid flow channels represent a broad concept including also, for example, the aforementioned chemical liquid flow channels 93, 94.

(2) In the second embodiment, it is not always necessary to use the frame member as a constituent element. The specific feature of the second embodiment is that the opening formed in a valve chamber where the valve member operates is opened and closed by another valve member. Therefore, the method for mounting the valve member actuator on the valve body is not limiting. In addition, the flow channel for purging fluid is also not necessary. A total of at least three or more flow channels that can be set to communicate or cut off from communication may be connected and the number of valve member actuators may be five or more.

(3) In the above-described embodiments, the chemical liquid is discharged from the flow channel by purging with a purge gas, but the chemical liquid may be also discharged by using a liquid. Generally, a chemical liquid may be discharged by purging with a fluid. The valve member actuator 40*a* and the valve member actuator 40 are also referred to as the purging fluid supply control valve and the purging fluid discharge control valve, respectively. The connection flow channel 36*a* and the connection flow channel 36 are also referred to as the purging fluid supply flow channel and the purging fluid discharge flow channel, respectively.

(4) In the above-described embodiment, a HMDS chemical liquid for a semiconductor fabrication device is described by way of example as the chemical liquid, but chemical liquid of other types may be also used and liquids of other types may also be used.

(5) In the above-described embodiment, the plurality of storing space are located in a perpendicular to a direction of axis of frame member which has a pillar shape. However, the present invention is not limited to the constitution, and the plurality of storing space may be located in the direction of axis. The plurality of storing space may also be three-dimensionally located in the perpendicular direction and in the direction of axis.

(6) In the above-described embodiment, the valve member actuator is driven by fluid power. However, the valve member actuator may also be manually driven.

(7) In the above-described embodiment, this invention is implemented as a valve. However, it may also be implemented as the state quantity sensor and/or the state controller. The state quantity sensor is a flow meter or a thermometer, for example. The state controller is a pressure controller or a flow controller, for example. This invention is generally implemented as chemical fluid apparatus.

What is claimed is:

1. A chemical liquid circuit apparatus comprising:
    a main circuit member having:
        a chemical liquid channel for flowing a chemical fluid; and
        a main opening formed on an end of the chemical liquid channel;
    a sub-circuit member mounted on and in contact with the main circuit member in an elastically deformed state the sub-circuit member having a sealing surface for sealing the main opening from outside of the chemical liquid circuit apparatus; and
    a frame member having:
        a storing portion for storing the main circuit member; and
        a connecting opening disposed in a position connecting to the main opening of the main circuit member stored in the storing portion;
        a mounting portion on which the sub-circuit member is mounted; and
        an inner wall surface in contact with the main circuit member on an opposite side of the mounting portion.

2. The chemical liquid circuit apparatus of claim 1, wherein the storing portion further includes:
    an insert opening for inserting the main circuit member along the inner wall surface so as to install the main circuit member in the storing portion.

3. The chemical liquid circuit apparatus of claim 1,
    wherein the main circuit member includes a valve body having a plurality of chemical liquid channels,
    and wherein the sub-circuit member includes a valve member actuator having a valve member configured to switch channels by opening and blocking mutual communications between the plurality of chemical liquid channels.

4. The chemical liquid circuit apparatus of claim 3,
    wherein the plurality of chemical liquid channels include:
        a first flow channel;
        a second flow channel; and
        a first valve member chamber provided in a position for connecting the first flow channel and the second flow channel,
    and wherein the valve member actuator includes:
        a first valve member provided inside the first valve member chamber and configured to block the communications between the first flow channel and the first valve member chamber by closing a first opening connected to the first flow channel, the first opening being formed on an inner wall surface of the first valve member chamber; and
        a second valve member configured to block the communications between the second flow channel and the first valve member chamber by closing a second opening connected to the second flow channel, the second opening being formed in the inner wall surface of the first valve member chamber.

5. The chemical liquid circuit apparatus of claim 4,
    wherein the second flow channel includes:
        a second valve member chamber; and
        a coupling flow channel for connecting the second valve member chamber and the second opening,
    wherein the first valve member is configured to perform opening/closing operations within the first valve member chamber,
    and wherein the second valve member is configured to perform opening/closing operations within the second valve member chamber, the second valve member includes a contact portion which comes into contact with an inner surface of the second opening when the second valve member is inserted into the coupling flow channel.

6. The chemical liquid circuit apparatus of claim 5, comprising:
    a plurality of second flow channels and a corresponding plurality of second valve members.

7. The chemical liquid circuit apparatus of claim 5,
    wherein the first valve member is a diaphragm valve member including:
        a diaphragm membrane portion having a circumferential edge portion fixed to the valve body; and
        a protruding portion provided in a center of the diaphragm membrane portion and configured to open and close the first opening,
    and wherein the plurality of second flow channels are formed and disposed so as to have respective openings in an annular portion formed by partitioning by the diagraph membrane portion in the first valve member chamber.

8. The chemical liquid circuit apparatus of claim 1, wherein the sub-circuit member includes a state quantity sensor configured to sense a state quantity of the chemical fluid flowing in the main opening.

9. The chemical liquid circuit apparatus of claim 1, wherein the sub-circuit member includes a state controller configured to control a state quantity of the chemical fluid flowing in the main opening.

10. The chemical liquid circuit apparatus of claim 1, wherein the frame member includes a plurality of storing portions, each of the plurality of storing portions storing corresponding one of main circuit members,
    and wherein the sub-circuit member includes a joint channel connecting the main openings of the main circuit members stored in the storing portions.

* * * * *